US010129802B2

(12) United States Patent
Pelletier et al.

(10) Patent No.: US 10,129,802 B2
(45) Date of Patent: Nov. 13, 2018

(54) LAYERED CONNECTIVITY IN WIRELESS SYSTEMS

(71) Applicant: IDAC Holdings, Inc., Wilmington, DE (US)

(72) Inventors: Ghyslain Pelletier, Montreal (CA); Paul Marinier, Brossard (CA); Diana Pani, Montreal (CA); Ulises Olvera-Hernandez, Montreal (CA); Guanzhou Wang, Brossard (CA)

(73) Assignee: IDAC Holdings, Inc., Wilmington, DE (US)

(*) Notice: Subject to any disclaimer, the term of this patent is extended or adjusted under 35 U.S.C. 154(b) by 0 days.

(21) Appl. No.: 15/102,247

(22) PCT Filed: Dec. 5, 2014

(86) PCT No.: PCT/US2014/068953
§ 371 (c)(1),
(2) Date: Jun. 6, 2016

(87) PCT Pub. No.: WO2015/085273
PCT Pub. Date: Jun. 11, 2015

(65) Prior Publication Data
US 2016/0309379 A1 Oct. 20, 2016

Related U.S. Application Data

(60) Provisional application No. 61/913,073, filed on Dec. 6, 2013, provisional application No. 62/049,661, filed on Sep. 12, 2014.

(51) Int. Cl.
H04W 36/04 (2009.01)
H04L 5/00 (2006.01)
(Continued)

(52) U.S. Cl.
CPC ........... H04W 36/04 (2013.01); H04L 5/0048 (2013.01); H04W 24/08 (2013.01); H04W 76/12 (2018.02);
(Continued)

(58) Field of Classification Search
CPC ... H04W 36/04; H04W 76/02; H04W 76/025; H04W 60/00; H04W 76/12; H04W 76/15; H04W 76/27; H04W 5/0048; H04W 24/08
(Continued)

(56) References Cited

U.S. PATENT DOCUMENTS

2010/0190488 A1* 7/2010 Jung ..................... H04W 24/10
455/424
2011/0039552 A1* 2/2011 Narasimha .......... H04W 76/028
455/425
(Continued)

FOREIGN PATENT DOCUMENTS

JP 2012-044677 A 3/2012
JP 2013-143664 A 7/2013

OTHER PUBLICATIONS

3rd Generation Partnership Project (3GPP), R2-132750, "Initial Setup Procedure for Dual Connectivity", Sharp, 3GPP TSG-RAN WG2#83, Barcelona, Spain, Aug. 19-23, 2013, 3 pages.
(Continued)

Primary Examiner — Marisol Figueroa
(74) Attorney, Agent, or Firm — Condo Roccia Koptiw LLP

(57) ABSTRACT

Techniques and devices are disclosed for efficient offloading and/or aggregation of resources by providing different levels of connection management in a network. A wireless transmit/receive unit (WTRU) may support additional ECM and/or RRC states (e.g. inactive states) and/or transitions
(Continued)

that may enable a WTRU to act without an RRC connection and/or with reduced latency. A WTRU may operate with network resources with and/or without radio resources. A WTRU may operate in parallel with a plurality of layers, including a primary layer for which the WTRU may behave according to LTE or other behavior. The WTRU may be configured for operation in a secondary layer. The WTRU may establish a secondary layer security context and/or a tunnel or routing for the secondary layer for transport of user plane data between the WTRU and a gateway. The WTRU may determine to which layer uplink data may be applicable.

22 Claims, 15 Drawing Sheets

(51) Int. Cl.
    *H04W 24/08*    (2009.01)
    *H04W 76/27*    (2018.01)
    *H04W 76/15*    (2018.01)
    *H04W 76/12*    (2018.01)
    *H04W 60/00*    (2009.01)

(52) U.S. Cl.
    CPC ........... *H04W 76/15* (2018.02); *H04W 76/27* (2018.02); *H04W 60/00* (2013.01)

(58) Field of Classification Search
    USPC .................................................. 455/436–444
    See application file for complete search history.

(56) References Cited

U.S. PATENT DOCUMENTS

| | | | |
|---|---|---|---|
| 2011/0105109 A1 | 5/2011 | Uemura et al. | |
| 2011/0183661 A1* | 7/2011 | Yi | H04W 24/10 455/422.1 |
| 2012/0250578 A1 | 10/2012 | Pani et al. | |
| 2012/0281655 A1* | 11/2012 | Jung | H04W 24/10 370/329 |
| 2013/0084883 A1* | 4/2013 | Mihaly | H04W 4/028 455/456.1 |
| 2013/0250902 A1* | 9/2013 | Xu | H04W 74/006 370/329 |

OTHER PUBLICATIONS

3rd Generation Partnership Project (3GPP), R2-132830, "Summary of Email Discussion [82#15] [LTE/Het-Net] Small Cell Discovery", Huawei, 3GPP TSG-RAN WG2 #83, Barcelona, Spain, Aug. 19-23, 2013, pp. 1-19.

3rd Generation Partnership Project (3GPP), Tdoc R2-131328, "Dual Connectivity for Small Cell Deployments", InterDigital Communications, 3GPP TSG-RAN WG2 #81, Chicago, USA, Apr. 15-19, 2013, 4 pages.

$3^{rd}$ Generation Partnership Project (3GPP), TS 36.321 V11.3.0, "$3^{rd}$ Generation Partnership Project; Technical Specification Group Radio Access Network; Evolved Universal Terrestrial Radio Access (E-UTRA); Medium Access Control (MAC) protocol specification (Release 11)", Jun. 2013, 57 pages.

$3^{rd}$ Generation Partnership Project (3GPP), TS 36.331 V11.5.0, "$3^{rd}$ Generation Partnership Project; Technical Specification Group Radio Access Network; Evolved Universal Terrestrial Radio Access (E-UTRA); Radio Resource Control (RRC); Protocol specification (Release 11)", Sep. 2013, 347 pages.

* cited by examiner

LAYERED CONNECTIVITY IN WIRELESS SYSTEMS

CROSS-REFERENCE TO RELATED APPLICATIONS

This application is the National Stage entry under 35 U.S.C. § 371 of Patent Cooperation Treaty Application PCT/US2014/068953, titled "Layered Connectivity in Wireless Systems", filed Dec. 5, 2014, which claims the benefit of U.S. Provisional Patent Application No. 61/913,073, titled "Layered Connectivity in Wireless Systems", filed Dec. 6, 2013, and U.S. Provisional Patent Application No. 62/049,661, titled "Layered Connectivity in Wireless Systems", filed Sep. 12, 2014, the contents of all of which being incorporated by reference as if fully set-forth herein in their respective entirety, for all purposes.

BACKGROUND

In an LTE wireless communication system, a wireless transmit/receive unit (WTRU) may receive signaling, e.g., L3/RRC signaling that may reconfigure one or more aspects of the WTRU's configuration. Such aspects may include reconfiguration of one or more L1/PHY parameters or L2 parameters (e.g., MAC, RLC, and/or PDCP). Such reconfiguration may include a mobility control element, such that a handover procedure may be triggered.

In an LTE system that may support multi-cell operation using intra-eNodeB (eNB) carrier aggregation, such signaling may reconfigure parameters associated with the WTRU's operation on multiple cells (e.g., the primary cell (PCell) and/or one or more secondary cells (SCells)), which may include the addition, modification, and/or removal of one or more SCells.

A WTRU may be configured with dual connectivity, e.g., a configuration in which the WTRU may have access to resources of cells associated with different eNBs. The network may control connectivity using, for example, a single MME/S1-c connection terminating in an MeNB.

SUMMARY

The Summary is provided to introduce a selection of concepts in a simplified form that are further described below in the Detailed Description. This Summary is not intended to identify key features and/or essential features of the claimed subject matter, nor is it intended to be used to limit the scope of the claimed subject matter.

Systems, methods, and instrumentalities are disclosed for efficient offloading and/or aggregation of resources by providing different levels of connection management in a network. A wireless transmit/receive unit (WTRU) may support additional ECM and RRC states (e.g. inactive states) and transitions enabling a WTRU to act without an RRC connection and with reduced latency. A WTRU may operate with network resources (e.g. S1 bearer) with and without radio resources.

A WTRU may operate in parallel with a plurality of layers, e.g., using a single IP interface, including a primary layer for which the WTRU may behave according to LTE or other behavior. In the primary layer, the WTRU may be configured for operation in a secondary layer (or second layer) such that the WTRU may establish a secondary layer security context and/or a tunnel or routing for the secondary layer for transport of user plane data between the WTRU and a gateway.

For the secondary layer, the WTRU may determine which layer uplink data may be applicable to. If the uplink data is applicable to a secondary layer, transmission parameters may be selected. If the transmission parameters are insufficient, the WTRU may request reassociation of traffic, a service, or a bearer to a primary layer or initiate a connection reestablishment.

A WTRU may be operated in a first cell of a first layer of the network. While the WTRU is operated in the first layer of the network, it may be configured to operate in a second layer of the network. The WTRU may be operated in the second layer of the network.

Embodiments contemplate a wireless transmit/receive unit (WTRU) that may comprise a processor that may be configured to receive a signal via a first layer. The signal may include a request for a presence indication using a secondary layer. The processor may be configured to select a secondary layer cell for the presence indication. The processor may be configured to send a presence indicator message via the secondary layer to the secondary layer cell. The processor may be configured to receive a presence indication response from the secondary layer cell.

Embodiments contemplate a node of a wireless communication network, where the wireless communication network may include a primary layer and a secondary layer. The node may comprise a processor that may be configured to receive a signal including downlink (DL) data for a wireless transmit/receive unit (WTRU). The processor may be configured to determine the WTRU is located in a tracking area or a location area. The processor may be configured to send a location request update to one or more evolved-NodeBs (eNBs) of the network corresponding to the tracking area or the location area. The location update request may identify the secondary layer of the network. The processor may be configured to receive a path update request via the secondary layer of the network from the WTRU in response to the location request update. The processor may be configured to send the WTRU a path update response via the secondary layer of the network.

Embodiments contemplate a wireless transmit/receive unit (WTRU) in communication with a wireless communication network. The WTRU may comprise a processor that may be configured to establish an active S1 connection with a first cell of a first layer of the network. The active S1 connection may be established without an active radio resource control (RRC) connection with the first cell of the first layer of the network. The S1 connection may be manageable by the network. The processor may be configured to operate the WTRU in a first state. The first state may include an RRC-inactive state that may be distinct from an RRC-idle state and an RRC-connected state. The processor may be configured to operate the WTRU in the first layer of the network. The processor may be configured to operate the WTRU in a secondary layer of the network.

BRIEF DESCRIPTION OF THE DRAWINGS

The following detailed description of example embodiments is provided with reference to the appended drawings. For the purposes of illustration, the drawings show example embodiments. The contemplated subject matter is not limited to the specific elements and/or instrumentalities described or illustrated. And absent specific notation to the contrary, no subject matter is contemplated as necessary and/or essential. In addition, the described embodiments may be employed in any combination, in whole or in part. In the drawings.

DETAILED DESCRIPTION

A detailed description of example embodiments will now be described with reference to the various Figures. Although this description provides a detailed example of possible implementations, it should be noted that the details are intended to be examples and in no way limit the scope of the application. As used herein, the article "a" or "an", absent further qualification or characterization, may be understood to mean "one or more" or "at least one", for example. Also, as used herein, the phrase user equipment (UE) may be understood to mean the same thing as the phrase wireless transmit/receive unit (WTRU).

Figure 1A:
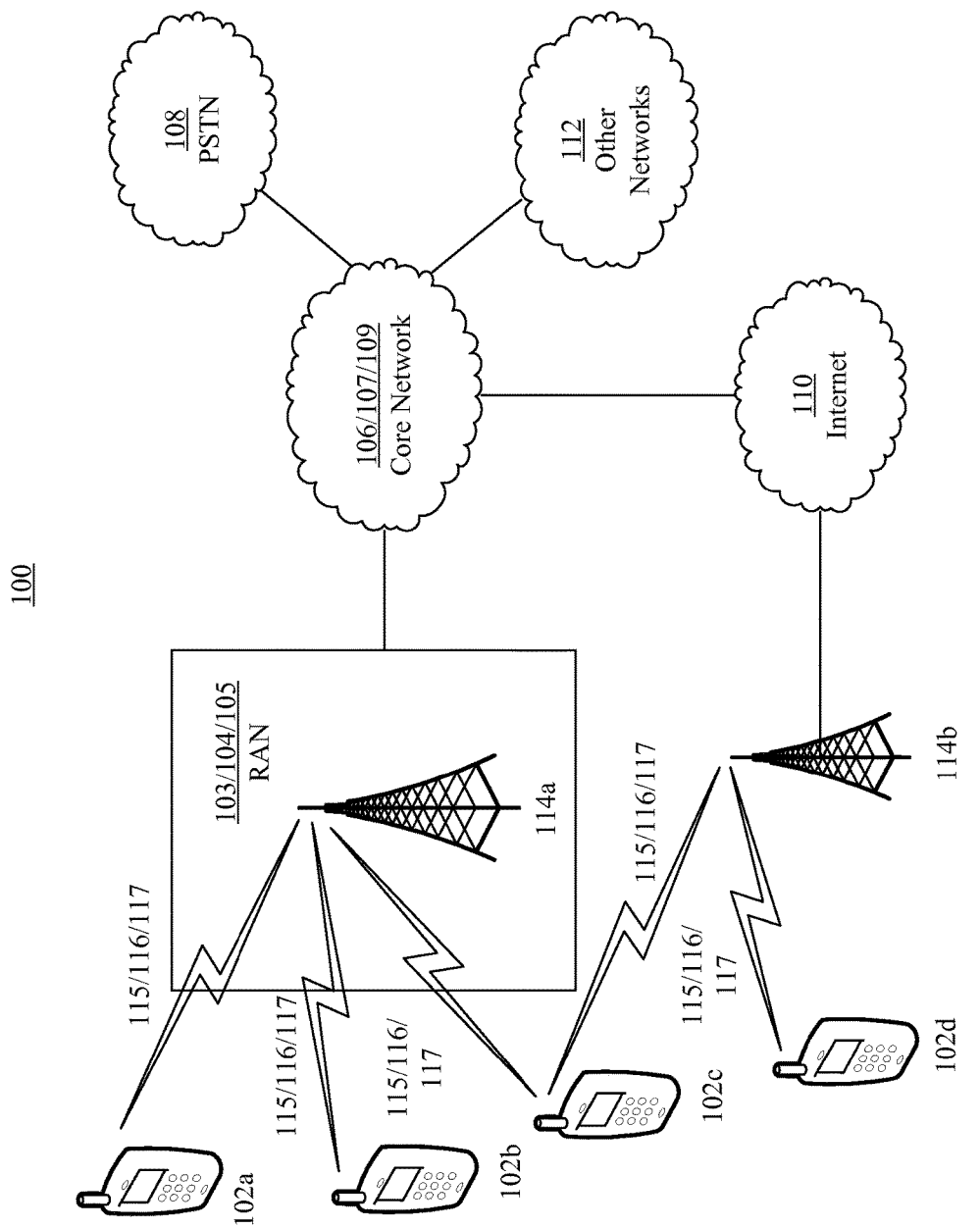
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications system 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications system 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in some embodiments, the base station 114a may include three transceivers, e.g., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 103/104/105 and the WTRUs 102*a*, 102*b*, 102*c* may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114*a* and the WTRUs 102*a*, 102*b*, 102*c* may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114*a* and the WTRUs 102*a*, 102*b*, 102*c* may implement radio technologies such as IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In some embodiments, the base station 114*b* and the WTRUs 102*c*, 102*d* may implement a radio technology such as IEEE 802.11 to establish a wireless local area network (WLAN). In another embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, etc.) to establish a picocell or femtocell. As shown in FIG. 1A, the base station 114*b* may have a direct connection to the Internet 110. Thus, the base station 114*b* may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102*a*, 102*b*, 102*c*, 102*d*. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102*a*, 102*b*, 102*c*, 102*d* to access the PSTN 108, the Internet 110, and/or other networks 112. The PSTN 108 may include circuit-switched telephone networks that provide plain old telephone service (POTS).

The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102*a*, 102*b*, 102*c*, 102*d* in the communications system 100 may include multi-mode capabilities, e.g., the WTRUs 102*a*, 102*b*, 102*c*, 102*d* may include multiple transceivers for communicating with different wireless networks over different wireless links. For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
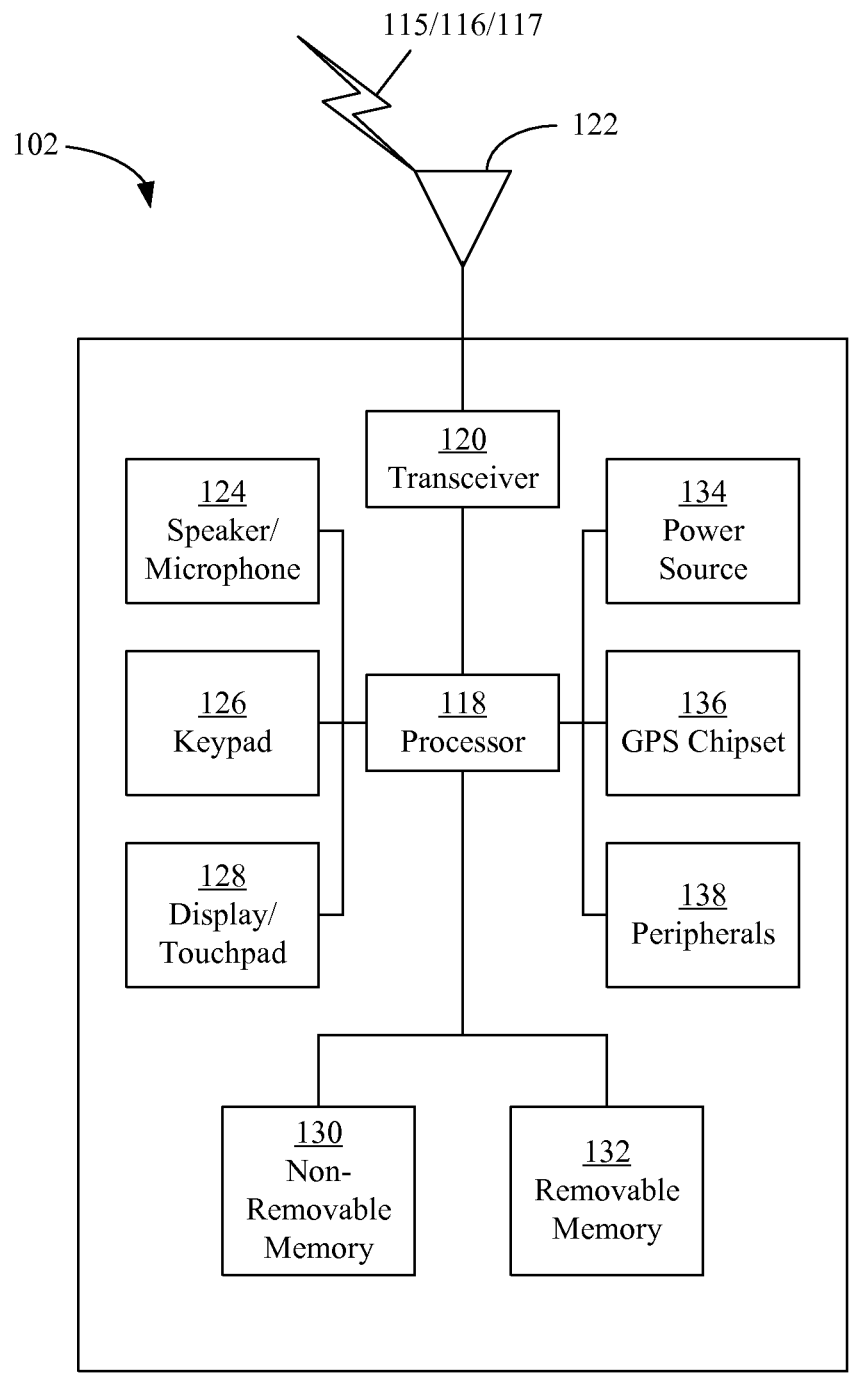
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114*a* and 114*b*, and/or the nodes that base stations 114*a* and 114*b* may represent, such as but not limited to transceiver station (BTS), a Node-B, a site controller, an access point (AP), a home node-B, an evolved home node-B (eNodeB), a home evolved node-B (HeNB or HeNodeB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 115/116/117. For example, in some embodiments, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in some embodiments, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination implementation while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
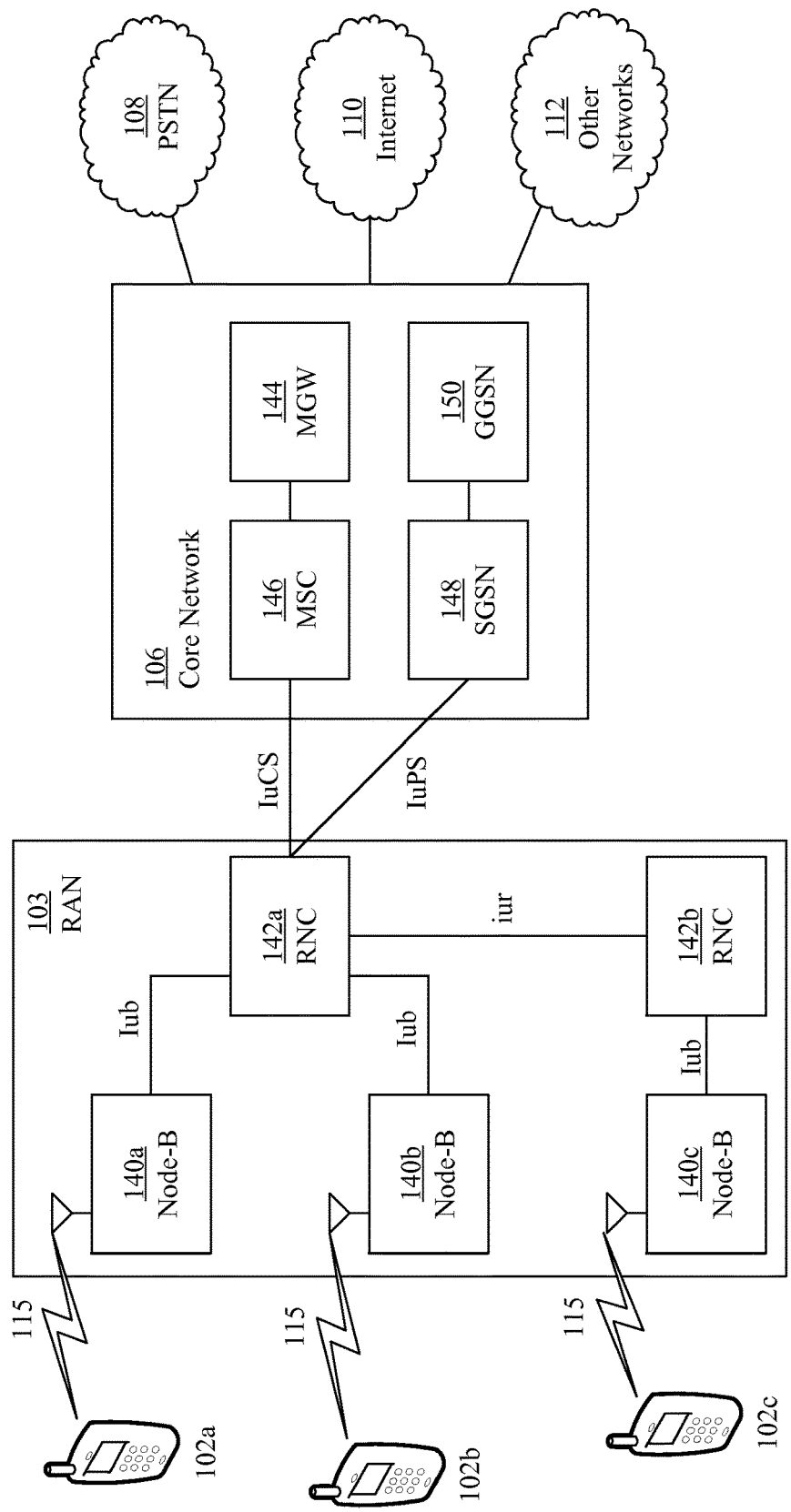
FIG. 1C is a system diagram of an example radio access network and an example core network that may be used within the communications system illustrated in FIG. 1A.

FIG. 1C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
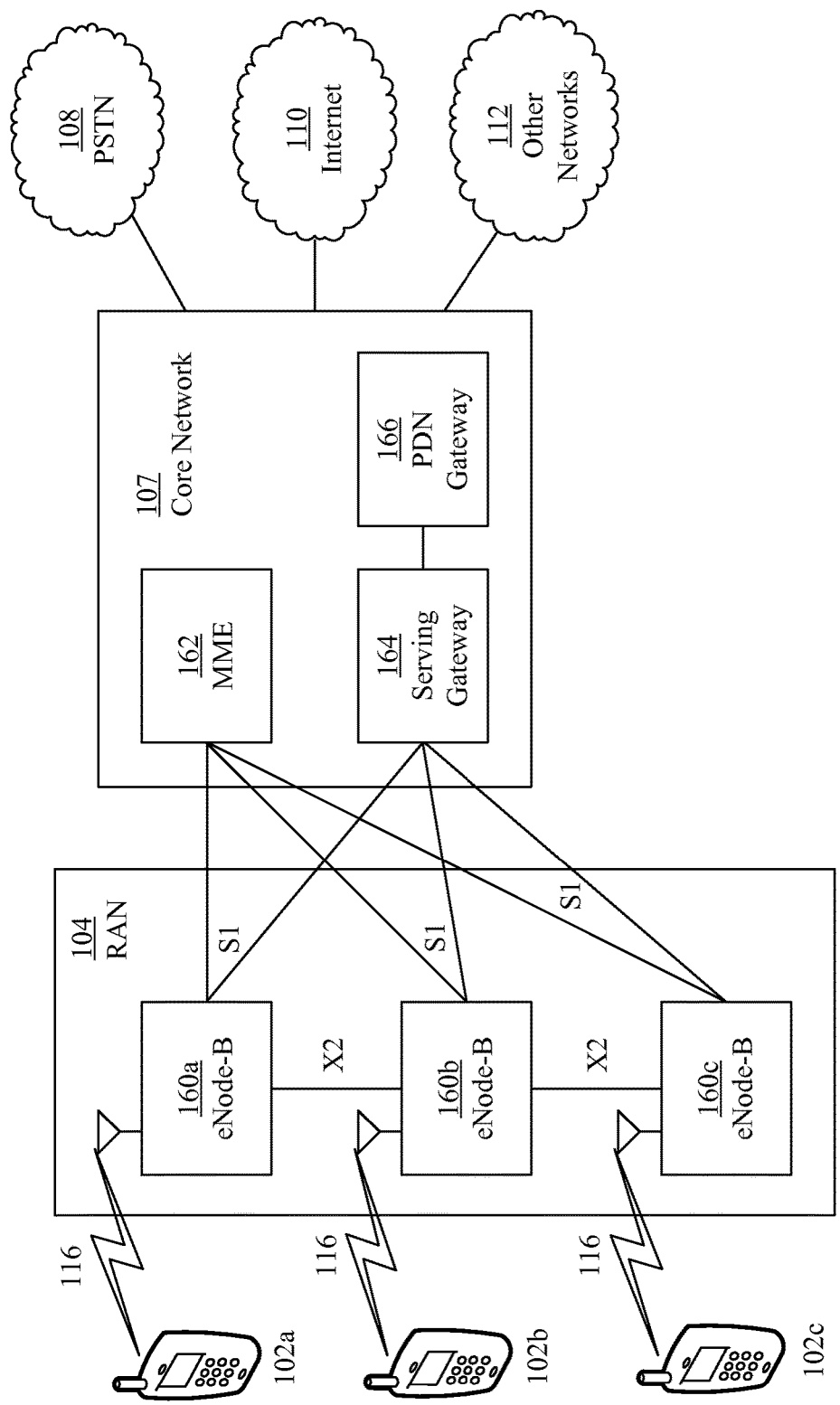
FIG. 1D is a system diagram of another example radio access network and another example core network that may be used within the communications system illustrated in FIG. 1A.

FIG. 1D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In some embodiments, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
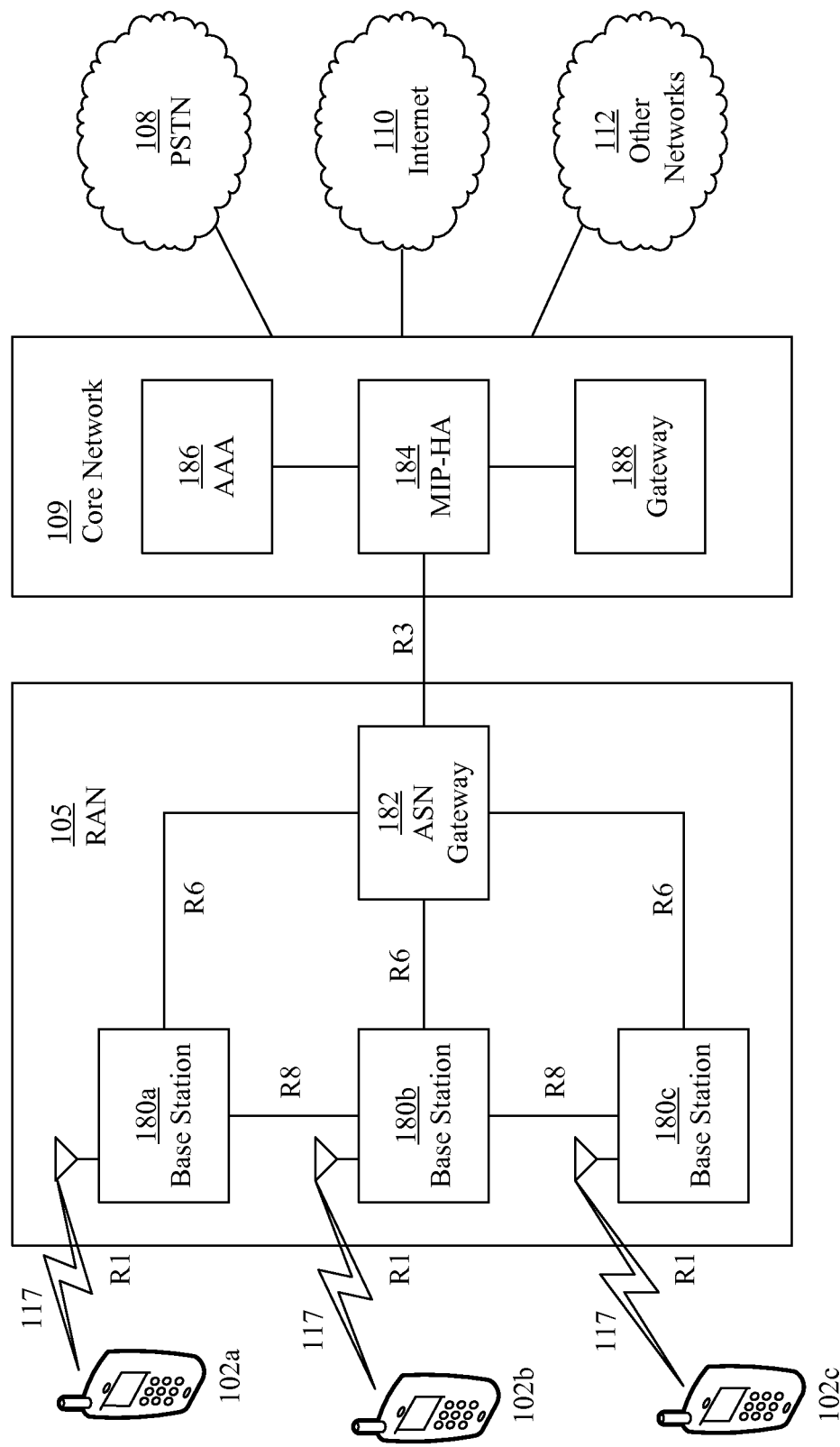
FIG. 1E is a system diagram of another example radio access network and another example core network that may be used within the communications system illustrated in FIG. 1A.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In some embodiments, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

In an LTE wireless communication system, a wireless transmit/receive unit (WTRU) may receive signaling, e.g., L3/RRC signaling that may reconfigure one or more aspects of the WTRU's configuration. Such aspects may include reconfiguration of one or more L1/PHY parameters or L2 parameters (e.g., MAC, RLC, and/or PDCP). Such reconfiguration may include a mobility control element, such that a handover procedure may be triggered.

WTRU states may include EPS Connection Management (ECM) connected and idle states and Radio Resource Control (RRC) Connected and Idle states. Embodiments recognize that user plane latency may be incurred in unsynchronized states in RRC-Idle and RRC-Connected states.

In an LTE system that may support multi-cell operation using intra-eNodeB (eNB) carrier aggregation, such signaling may reconfigure parameters associated with the WTRU's operation on multiple cells (e.g., the primary cell (PCell) and/or one or more secondary cells (SCells)), which may include the addition, modification, and/or removal of one or more SCells.

The WTRU may prepare an RRC message (e.g., RRC Connection Reconfiguration Complete) when a reconfiguration procedure is successful. The RRC message may indicate that the WTRU has applied a configuration as signaled by the reconfiguration message that triggered the reconfiguration procedure. When the WTRU has prepared the RRC message, it may then submit the RRC message to a signaling radio bearer (SRB) for transmission to the eNB.

If the WTRU cannot perform the RRC Connection Reconfiguration procedure, it may keep the configuration that it used prior to the reception of the reconfiguration signaling, and it may initiate an RRC Connection Reestablishment procedure with a reestablishment cause set to reconfiguration failure.

The transmission of the RRC message, if successful, may indicate that the WTRU can still communicate using the radio interface to the corresponding eNB. If the WTRU performs a random access procedure (e.g., for the scheduling request), the WTRU may synchronize its uplink transmission timing and set a transmit power in the process. When data becomes available for transmission for the SRB, the WTRU may trigger a scheduling request (SR). The SR may be performed using a dedicated PUCCH resource (D-SR), if such a resource is configured and available, or using a random access channel (RACH, e.g., using RA-SR).

A WTRU may be configured with dual connectivity, e.g., a configuration in which the WTRU may have access to resources of cells associated with different eNBs. The network may control connectivity using, for example, a single MME/S1-c connection terminating in an MeNB.

From the perspective of the control plane, the WTRU may have established an RRC connection with a first eNB (e.g., an MeNB) and may support a configuration in which one or more cells may be associated with a second eNB (e.g., a SeNB). If it may be assumed that the RRC connection terminates at the MeNB, the complete message may be received by the RRC entity in the MeNB.

From the perspective of the user plane architecture, the network may terminate S1-u in the MeNB (e.g., for one or more, or all, EPS bearers) or it may (e.g., additionally) terminate S1-u in the SeNB (e.g., for one or more EPS bearers).

From the perspective of the L2 transport of SRB data and/or user plane traffic, data for a given radio bearer may be transmitted from the network to the WTRU using a single L2 path or using either L2 path (e.g., DL multi-flow). Data transmitted may be transmitted from the WTRU to the network using a single L2 path or using either L2 path (e.g., UL multi-flow). Multi-flow may be realized by configuration of a bearer such that it may conceptually be mapped to different cells associated with more than one eNB.

A transport bearer function may be modeled as a combination of Quality of Service (QoS)-related aspects and/or in terms of a routing function. QoS-related aspects may be parameterized in terms of (e.g., maximum or guaranteed) bit rate, maximum tolerable latency, or the like. Routing for a bearer may be achieved using a physical or logical (e.g., using a tunneling function based on GTP-u or based on an IP tunnel) point-to-point transport path.

Primary MAC entities and secondary MAC entities may be separate processes conceptually related to cells of different eNBs (e.g., an MeNB and a SeNB). A primary MAC entity or a secondary MAC entity may be a MAC entity that makes the distinction between a Uu (L1/PHY) conceptually associated with a first eNB (e.g., an MeNB) and a second eNB (e.g., a SeNB). The WTRU may have a primary MAC entity associated with the MeNB and a secondary MAC entity associated with an SeNB.

The primary MAC entity may correspond to the MAC entity that is configured with the PCell on which the WTRU established the RRC connection. The secondary MAC entity may be configured with a special cell, in which case the cell may be configured with an uplink carrier and with additional PUCCH resources.

Latency may be reduced in Contention Based (CB) transmission. For example, CB transmission may allow uplink synchronized WTRUs to transmit uplink data without sending a scheduling request in advance. In some embodiments, static assignment of CB resources may be avoided and CB resources may be dynamically assigned, which may depend on the uplink load. Dynamic assignment of uplink resource blocks for CB transmission may be achieved using the Downlink Physical Control CHannel (PDCCH). In some embodiment, CB grants may be assigned to unused resources on a per subframe basis without affecting scheduling of uplink CF transmissions.

Contention Based Radio Network Temporary Identifiers (CB-RNTI) may identify CB uplink grants on the PDCCH. In some embodiments, CB uplink grants may have a format used for uplink CB transmission, e.g., specify Resource Blocks, Modulation and Coding Scheme and Transport Format. In other embodiments, WTRUs may listen for CB uplink grants addressed to CB-RNTIs in addition to grants addressed to a dedicated C-RNTI. In some embodiments, available CB-RNTIs in a cell may be broadcast or signaled to each WTRU during RRC connection setup. In some embodiments, WTRUs may select a CB-RNTI or C-RNTI for decoding, which may provide backward compatibility.

In some embodiments, the probability of collisions when using a shared CB resource may be reduced by allowing a WTRU to use resources selectively for transmissions associated with a subset of its radio bearers.

Resources from similar systems may be aggregated (e.g., R12 LTE inter-eNB aggregation using dual connectivity). Resources from different systems (e.g., R12 LTE/WiFi interworking) may be aggregated. An operator may offload traffic from a macro cell or eNB to another cell or eNB that may offer a hot spot overlay network. Traffic may range from intermittent Web browsing to high-definition video services. A user of such an application may have a slow and/or predictable mobility pattern that may enable offloading decisions.

Smartphones may support a multitude of applications and may contribute to congestion in macro cells. Applications may generate intermittent background data traffic, which may not directly originate from user intervention. Intermittent small data transfers may create overhead in terms of control plane traffic (e.g., L3 signaling over Uu to establish an RRC connection and/or commitment of resources to maintain an RRC connection, and/or signaling between a RAN and a CN to establish, move, and/or tear down bearers).

User plane latency may be incurred in multiple scenarios. For example, latency may be incurred during a WTRU's first transmission for a new data session from an RRC IDLE state and unsynchronized state. Latency may also be incurred during a transmission burst for an existing data session from an RRC CONNECTED state after a relatively long period of inactivity in an unsynchronized state. In a transition from ECM/RRC-IDLE to ECM/RRC-CONNECTED, the bottleneck may often be the procedure that may be used to setup S1 connectivity and/or security activation.

Aggregation within the same system (e.g., LTE) may be used. The QoS architecture and the mobility management used by wireless systems may involve radio resource management and/or mobility management and may rely on control by the network, for example, to provide QoS guarantees. For example, the network may not make distinctions between types of traffic and/or with respect to QoS criteria of the traffic that may be a candidate to offload in terms of how connectivity is managed in the system. Some aspects of connectivity of a mobile device and its related impact on the network may be relaxed for one or more classes of traffic and/or devices.

Offloading and/or aggregation across different systems may be limited as to how well integration may be performed and/or how efficient the resulting system may become. Interactions between different radio access technologies may enable offloading. Complexity may be increased in the core network, in the WTRU, and/or in the RAN.

Different levels of connection management may be provided in a system to enable efficient offloading and/or efficient aggregation of resources. WiFi offload hotspots may be replaced with cells that use compatible radio access technology that may have coverage that may be smaller than a macro cell and that may provide an overlay network. Access methods for a cell may be logically separated such that a mobile device may access a cell, e.g., a legacy cell, using methods disclosed herein. Latency may be reduced for user plane transmissions, such as after a relatively long period of inactivity.

The disclosed subject matter may be characterized by relatively unmanaged connectivity. The difficulty of integration with a macro system and/or the difficulty of observing and/or controlling WTRU behavior for a WiFi interface may be reduced or eliminated.

The disclosed subject matter is described in the context of 3GPP LTE technology and related specifications, but may be equally applicable to other wireless technologies that access multiple wireless layers and/or connect to multiple radio access technologies, such as other 3GPP technologies based on WiFi, WCDMA, HSPA, HSUPA, and/or HSDPA.

A WTRU configured with layered connectivity may operate according to a first (e.g. a legacy) behavior in a first layer (e.g., a primary layer) such that it may perform legacy RRC procedures according to the applicable state (e.g., IDLE/CONNECTED for a LTE-capable WTRU), and may also perform any of the procedures described herein such that it may enable operation in at least a second layer. A layer may be a logical grouping of functions and/or resources of either a same serving cell or different serving cells, which may be associated with different eNBs.

In some embodiments, the primary layer may be similar to and/or include legacy LTE behavior, behavior that may include one or more additional procedures that enables the configuration of a second layer.

In some embodiments, a WTRU may keep in memory one or more of: a separate configuration of one or more of specific bearers (e.g., EPS, or a DRB configuration), a separate security context, and/or a separate physical layer configuration. The WTRU may perform transmissions using one or more of those configuration aspects, perhaps independently of the RRC state of being IDLE or CONNECTED. The physical layer configuration may use either the same (set of) serving cell(s) in particular in CONNECTED mode and/or the cell used for camping in IDLE mode, or a separate (set of) serving cell(s) in either CONNECTED or IDLE mode.

In some embodiments, a separate set of cells may be configured for the secondary layer, perhaps for example where a separate secondary MAC instance may be configured, among other scenarios. One or more cells of the separate set of cells can be configured for the secondary MAC instance.

In some embodiments, a primary layer may be viewed as one or more functions and/or one or more behaviors that may correspond to one or more of: a legacy type of access or an access that may correspond to single connectivity operation (e.g., possibly augmented by support in the corresponding procedures for signaling and/or configuration of a secondary layer). A secondary layer may include other additional resources or techniques (e.g., signaling, configuration aspects, and/or additional procedures) that may be used to enable further connectivity to the network.

In some embodiments, a primary layer (e.g. a first layer) may correspond to a WTRU's operation according to the methods, logic, and/or behavior associated with a first radio access technology, such as LTE RAT. A secondary layer may correspond to a WTRU's operation according to the methods, logic, and/or behavior such as by the methods described herein. A secondary bearer may correspond to a user plane connection established for a secondary layer. A secondary bearer may enable routing of data between a WTRU and a network node, such as a gateway node. A secondary connection or secondary connectivity may correspond to connectivity that may enable the WTRU to transmit and/or receive data to or from a secondary layer. A secondary RRC connection may correspond to the methods and procedures that may be specific to the control plane of the access for the secondary layer.

Figure 2A:
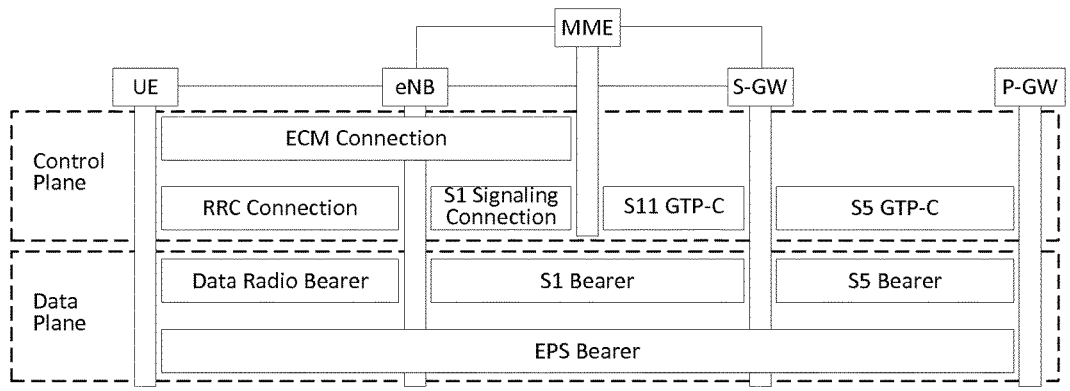
FIG. 2A is a diagram of example system components in the following states: EMM-registered, ECM-connected and/or RRC-connected, consistent with embodiments.

FIG. 2A is a diagram of example system components in the following states: EMM-registered, ECM-connected and RRC-connected. This is known as state C. In the EMM-registered state, a WTRU is attached to an LTE network and an EPS bearer is established. In the ECM-connected state, physical resources are assigned for the ECM connection, e.g., radio resources, such as data radio bearer (DRB) and signaling radio bearer (SRB), and network resources, such as S1 bearer and S1 signaling connection. In the RRC-connected state, an RRC connection is established.

Figure 2B:
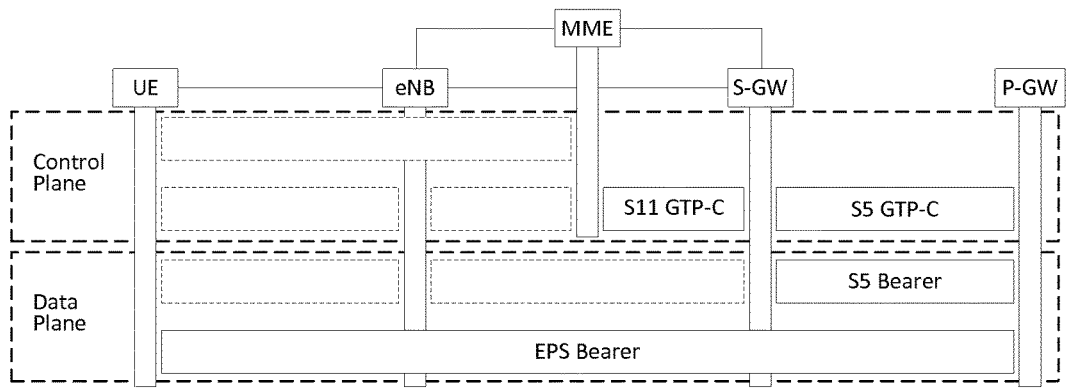
FIG. 2B is a diagram of example system components in the following states: EMM-registered, ECM-idle and/or RRC-idle, consistent with embodiments.

FIG. 2B is a diagram of example system components in the following states: EMM-registered, ECM-idle and RRC-idle. This is known as state D. In the EMM-registered state, a WTRU is attached to an LTE network and an EPS bearer is established. In the ECM-idle state, there is no ECM connection and there are no physical resources assigned. In the RRC-idle state, there is no RRC connection.

Figure 2C:
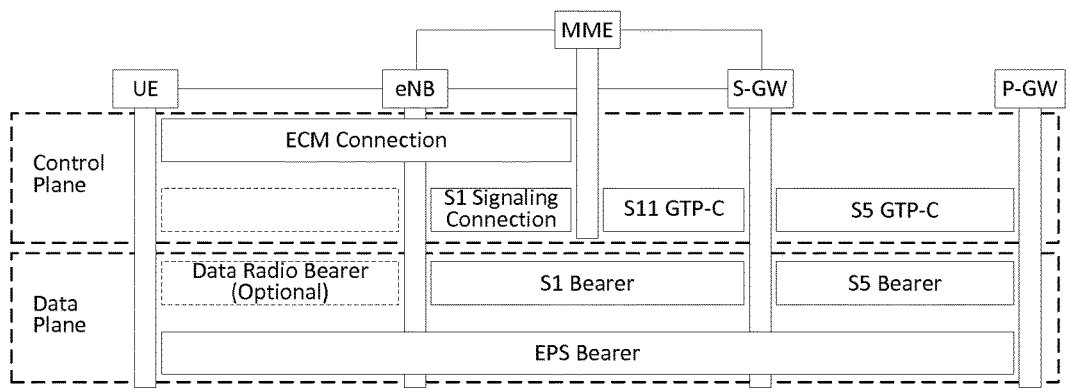
FIG. 2C is an example diagram of example system components in the following states: EMM-registered, ECM-inactive and/or RRC-inactive, consistent with embodiments.

FIG. 2C is an example diagram of example system components in the following states: EMM-registered, ECM-inactive and RRC-inactive. In the EMM-registered state, a WTRU may be attached to an LTE network and an EPS bearer may be established. The ECM-inactive and RRC-inactive states illustrate an example state that may be used to reduce latency. For example, an ECM-inactive state may correspond to a state where an ECM connection is maintained with or without actively managing radio resources between a WTRU and a RAN (e.g., an eNB), for example across a secondary layer. As shown in the example in FIG. 2C, in an example of operation in the ECM-inactive/RRC-inactive state, an ECM-connection and network resources, such as S1 bearer and S1 signaling connection, may be actively maintained while radio resources, such as data radio bearers (DRBs) and/or signaling radio bearer (SRB), may or may not be active. An RRC connection may also be inactive/no actively update in an RRC-inactive state.

As an example, the RRC-inactive/ECM-inactive states may be used in a secondary layer in order to allow for some forms of autonomous mobility by the WTRU in the secondary layer. For example, by maintaining core network resources as if the WTRU had maintained an active connection (e.g., ECM-connected), the WTRU, upon accessing a RAN resource (e.g., an eNB) can send an indication to the network that a previous ECM connection had been established and maintained, which would allow the network to perform reconfigurations in order to allow the WTRU to use the pre-configured ECM resources via the access RAN node. For example, upon reaching an eNB, the WTRU—without establishing a full RRC connection (e.g., while remaining in RRC-inactive) may send data and/or signaling to the eNB that identifies the resources associated with the WTRU's ECM connection for the secondary layer, which the eNB can used to route the transmission within the core network. Thus, in an example, the RRC inactive state may be characterized by the core network maintaining dedicated resources for the WTRU (e.g., ECM connection, S1 signaling connection, S1 bearer, EPS bearer, etc.) without a RAN node actively managing the radio resources used by the WTRU to access the network. The WTRU may utilize the RRC-inactive state in a secondary layer, while a primary layer may be in the RRC Connected State or the RRC Idle state.

Such techniques may permit a WTRU to maintain a limited network connection in a secondary layer in order to reduce latency without the active management of radio resources. In an example, a WTRU operating with layered connectivity may be in an RRC IDLE mode in a primary layer and may camp on a first cell while it is configured with a second layer and may use resources in a cell, e.g., for a specific service. Examples of specific services include, but are not limited to, a best-effort service including background downloading of applications, background traffic generated by idle applications or services requiring low latency, such as transmission of first packet(s) in a burst following a period of inactivity.

The cell in which resources may be used may be the same cell the primary layer camps on (first cell). This may be referred to as cell-based layering. From the perspective of the air interface, layering may be conceptually viewed as a logically separated (e.g. best-effort or low latency) access method while the WTRU continues to monitor paging according to legacy behavior for downlink data arrival related to a QoS-managed access (e.g. for QoS-managed services). In some embodiments, layering may be viewed as a set of methods that may enable decoupling of access principles from camping principles.

The cell may also be a second cell of the same eNB associated with the first cell. This may be referred to as eNB-based layering. From the perspective of the air interface, in some embodiments, layering may be conceptually viewed as a method to manage radio resources using carrier aggregation. In some embodiments, layering may be viewed as a set of methods that may enable decoupling between IDLE mode cell selection or reselection and access principles for a given eNB, where inter-eNB interactions may not be assumed.

The cell may also be a second cell of a different network node. This may be referred to as inter-eNB layering. From the perspective of the air interface, layering may be conceptually viewed as a method of accessing cells of different eNBs. In some embodiments, layering may be viewed as a set of methods that may enable decoupling between IDLE mode cell selection or reselection and access principles without restrictions, such that network interactions may be assumed.

In any of these examples, the network may reach a WTRU using a plurality of methods, such as paging in the primary layer for QoS-managed service or for updating the WTRU's configuration for layered connectivity or such as by secondary connectivity for data that may not use QoS management from the network or data with low latency requirements. The WTRU may access the network using a plurality of methods, such as by establishing an RRC connection in the primary layer for QoS-managed service or when the secondary connectivity may not be sufficient for the WTRU's needs for uplink transmissions using the secondary connectivity. The WTRU may access the network, for example, using secondary connectivity for any data, such as data that may not use QoS-management by the network or that requires low latency access.

In some embodiments, layering may be utilized so that a WTRU and the network maintain an L2 transport connection, e.g., between the WTRU and the access gateway (GW), even in the absence of an established RRC connection, such as when tight management of radio resources may be less useful or undesirable for one or more cells of an eNB.

The primary and secondary layers may be used in parallel. In some embodiments, the secondary layer may be used for offloading the primary layer. A WTRU operating with layered connectivity may be in an RRC CONNECTED mode in a primary layer and may use resources of a first cell. A resource may be used for one or more specific services, e.g., for a QoS-managed service, such as VoIP, while it may also be configured with a second layer and may use resources in a cell. A resource may be used for one or more other specific services. Such other service(s) may be a best-effort service including background downloading of applications, background traffic generated by idle applications or services requiring low latency, such as transmission of the first packet(s) in a burst following a period of inactivity.

The cell in which resources may be used may be the first cell (e.g., cell-based layering). From the perspective of the air interface, layering may be conceptually viewed as a method to manage radio resources in a cell (e.g., an RRM method). Different transmissions, user traffic, and/or services may use different resource allocation, scheduling, and/or connectivity methods and principles, including simultaneously, for the same cell.

The cell may also be a second cell of the same eNB associated with the first cell (e.g., eNB-based layering). From the perspective of the air interface, layering may be conceptually viewed as a method to manage radio resources using carrier aggregation (e.g., an intra-eNB carrier aggregation method). Different transmissions, user traffic, and/or services may use different resource allocation, scheduling, and/or connectivity methods and principles (e.g., simultaneously) towards the same eNB but differently for each concerned cell.

The cell may also be a second cell of a different network node (e.g., inter-eNB layering). From the perspective of the air interface, layering may be conceptually viewed as a method to access cells of different eNBs (e.g., an inter-eNB carrier aggregation method or a dual connectivity method). Different transmission, user traffic, and/or services may use different resource allocation, scheduling, and/or connectivity methods and principles, including simultaneously, but for different cells associated with different eNBs. These methods and principles are further described below.

A logical node (e.g., a control plane (CP) anchor) may act as an anchor for a control plane and/or for the secondary RRC connection, if applicable. This node may be an eNB. The eNB may control at least some aspects of the WTRU's secondary connectivity, for example, using an L3 protocol, such as RRC. The eNB may receive one or more configuration aspects (e.g., security, access parameters for the secondary layer) from another network node, e.g., an MME that may be included in signaling using dedicated or broadcast transmissions towards the WTRU using the RRC protocol. For example, such eNB may be an MeNB. In some embodiments, the MeNB may be similar to an MeNB defined for dual connectivity.

The node may be an MME or a proxy function (e.g., a Proxy-MME). The MME may control at least some aspects of the WTRU's secondary connectivity using a higher layer protocol such as NAS. The WTRU may receive one or more configuration aspects (e.g., security, access parameters for the secondary layer) from an MME using a NAS procedure. Signaling may be carried using the RRC protocol, for example, using dedicated or broadcast transmissions.

A logical node may act as an anchor for security. For example, the node may be an MME or a proxy function (e.g., a Proxy-MME). The security protocol may terminate in the MME for the WTRU's secondary connectivity for security functions, such as configuration, key derivation, and/or rekeying, for example, if the MME is the control plane anchor. This may be referred to as MME Light.

The node may be an eNB. The security protocol may terminate in the eNB for the WTRU's secondary connectivity for security functions, such as configuration, key derivation, and/or rekeying, for example, if the eNB is the control plane anchor. The security protocol may terminate in the eNB for the WTRU's secondary connectivity for L2 and/or user plane ciphering and/or authentication, for example, if the eNB is the termination point for the bearer used for secondary connectivity. In some embodiments, the eNB may receive one or more configuration aspects (e.g. security context, security keys, bearer information, which may include L2 sequencing information, access parameters for the secondary layer) from another network node, such as a source eNB. A source eNB may, for example, be an eNB that previously exchanged data with the WTRU according to secondary layer principles or with which the WTRU last completed a presence notification or routing update procedure for a secondary layer.

The node may be a gateway. The security protocol may terminate in the gateway for the WTRU's secondary connectivity for L2 and/or user plane ciphering and/or authentication, for example, if the gateway is the termination point for the bearer used for secondary connectivity.

A logical node (e.g., user plane (UP) anchor) may act as the anchor for the user plane. The node may be an eNB. The bearer may terminate in the eNB for the WTRU's secondary connectivity for user plane traffic. The node may be a gateway. The gateway may terminate the bearer. The gateway may terminate an IP tunnel, for example, if the gateway is the termination point for the bearer used for secondary connectivity.

Local breakout may be supported in the radio access network.

Security at L2 transport may be supported. The same security context may be used for multiple cells. For example, a WTRU may use the same security context in an area served by the same security anchor point (e.g., per MME and/or per gateway) instead of per eNB. In some embodiments, a WTRU may use the same security context with a plurality of eNBs/cells, which may include updating the security context as necessary. For example, a WTRU may update an active security context when it successfully performs a notification/routing update procedure for a cell associated with the same security anchor. Security may also be disabled.

Secondary connectivity or parts of its related configuration may be established and/or applicable for a plurality of cells. For example, a WTRU may perform transmissions at L2 and/or PHY with little or no RRC dedicated signaling and/or minimal RRC involvement for a given cell, once the WTRU is configured with secondary connectivity.

Macro coverage may be present in the primary layer. A WTRU configured with secondary connectivity may access resources according to methods associated with the secondary layer whether the WTRU is in an RRC IDLE mode or in an RRC CONNECTED mode in the primary layer. In some embodiments, availability and/or use of methods associated with secondary connectivity may depend on selection of a cell for camping in RRC IDLE mode in the primary layer.

Methods may be used alone or in combination with other methods to implement a secondary access layer. For example, in the control plane, methods may be used to permit a WTRU to perform network connectivity management procedures, e.g., procedures for management of S1 connectivity between the RAN (e.g. one or a subset of eNBs) and the CN (e.g. MME, gateway). In some embodiments, these procedures may be accomplished independent of the RRC state and/or without establishing an RRC connection. A WTRU may perform autonomous mobility. The WTRU may notify the network of its presence in a cell. Some example methods are described below.

A WTRU may operate according to RRC IDLE mode behavior in a primary layer. The WTRU may support layered connectivity and may be configured to operate in parallel with one or more secondary layers.

A WTRU in RRC IDLE mode in a primary layer and configured for layered connectivity may perform WTRU-autonomous mobility for a secondary layer (e.g., a cell selection procedure) that may be independent from the cell selection procedure used in the primary layer. In some embodiments, if the WTRU selects a suitable cell for the primary layer and the cell supports layered connectivity, the WTRU may use the outcome of the cell selection process of the primary layer for the secondary layer if it determines that the cell is also suitable for its secondary connectivity.

If the WTRU selects a suitable cell for the primary layer and a different cell for the secondary layer, the WTRU may perform autonomous mobility (e.g., cell selection or reselection) in the primary layer separately from the secondary layer.

In some embodiments, a transition to connected mode in a primary layer may be implemented based on L3/service-based aspects, traffic requirement related aspects and/or resource availability related aspects.

A transition to an RRC CONNECTED mode in a primary layer may be initiated when the WTRU determines that some data that is available for transmission may not be applicable for a transmission using the secondary layer. This may include control plane signaling, such as NAS signaling (e.g., a NAS Service Request and/or a TAU procedure) or RRC signaling (e.g., RRC Connection establishment) and/or user plane data for a service that may not be applicable to the secondary layer.

A transition to an RRC CONNECTED mode in a primary layer may be initiated when the WTRU determines that one or more criteria may not be met for its operation on the secondary layer. These criteria may include QoS characteristics. A QoS characteristic may be the type of traffic (e.g., whether secondary connectivity is applicable to the type of traffic or service). A QoS characteristic may be the bit rate (e.g., whether a bit rate of an applicable service or services is above a threshold and/or whether the secondary connection can support such a bit rate). A QoS characteristic may be a packet inter-arrival time (e.g., whether an inter-arrival time of an applicable service or services is below or above a threshold and/or whether the secondary connection is suitable for such a time). A QoS characteristic may be an internal buffer level or levels (e.g., whether the internal buffer levels and/or fill rate of an applicable service or services is below or above a threshold and/or whether the secondary connection is suitable for such levels. A WTRU may be active with a secondary connection and may determine that the observed QoS is insufficient and/or deteriorating and/or that a new service may use additional connectivity. The WTRU may initiate a transition to CONNECTED mode in a primary layer, e.g., to obtain additional resources.

A transition to CONNECTED mode may occur if the WTRU determines that secondary connectivity is no longer available. The WTRU may determine that it is no longer under coverage of a cell that supports its secondary connection. A transition to CONNECTED mode may occur if the WTRU determines that secondary connectivity is no longer suitable. The WTRU may determine that the radio conditions are below certain thresholds. A transition to CONNECTED mode may occur if the WTRU determines that secondary connectivity may be invalid. The WTRU may determine that it is within coverage of a cell that may support layered connectivity, but that the cell no longer belongs to the same area as the one for which the WTRU is configured.

A transition to CONNECTED mode may occur if the WTRU determines that secondary connectivity may be impaired. The WTRU may have an outdated configuration for a secondary connection, e.g., following expiration of time validity, detection that some information may need to be updated, failure to apply a configuration for the secondary connectivity (e.g., failure to acquire system information in a cell).

A WTRU may be active with a secondary connection and may determine that it is no longer in coverage of a cell that supports layered connectivity. Following reselection attempts, the WTRU may fail to identify such a cell after a certain amount of time. The WTRU may initiate a transition to CONNECTED mode in a primary layer, e.g., to obtain resources to maintain active services.

A WTRU in RRC IDLE mode in a primary layer and configured for layered connectivity may invalidate a configuration for a secondary layer when the WTRU determines that it is no longer within coverage of any suitable cell for the primary layer.

A WTRU in RRC IDLE mode in a primary layer and configured for layered connectivity may invalidate a configuration for a secondary layer when the WTRU determines that it is no longer attached to the network for the cell on which it is camping in the primary layer.

A WTRU in RRC IDLE mode in a primary layer and configured for layered connectivity may invalidate a configuration for a secondary layer when the WTRU determines that it is no longer within coverage of a cell that supports layered connectivity.

A WTRU in RRC IDLE mode in a primary layer and configured for layered connectivity may invalidate a configuration for a secondary layer when the WTRU determines that it is within coverage of a cell that supports layered connectivity, but that the cell does not match at least one aspect of the WTRU's configuration. For example, the cell may not support the minimum criteria of the active services applicable to the secondary layer. For example, the cell may not be part of the same group and/or area as indicated in the WTRU's configuration for the secondary layer.

A WTRU in RRC IDLE mode in a primary layer and configured for layered connectivity may invalidate a configuration for a secondary layer when the WTRU performs a TAU procedure for a primary layer, e.g., a change of MME area.

A WTRU in RRC IDLE mode in a primary layer and configured for layered connectivity may initiate a procedure to notify the network of the WTRU's location for the secondary layer when the WTRU determines that a change of cell has occurred for the secondary layer, that the cell supports layered connectivity, and that the cell is part of the same coverage area as the previous cell that it used for secondary connectivity.

A WTRU in RRC IDLE mode in a primary layer and configured for layered connectivity may initiate a procedure to notify the network of the WTRU's location for the secondary layer when the WTRU determines that a certain amount of time has elapsed since a specific event. The event may be the transmission of a presence notification, the completion of a procedure for presence notification or routing update or location update, a transmission performed on the secondary layer (e.g., if successfully acknowledged by the network), the successful decoding of a transmission performed on the secondary layer (e.g., if the transmission included user plane data, and/or if successfully received and acknowledged by the WTRU), control plane signaling sent or received using the primary layer such as a configuration or reconfiguration of the secondary connectivity when in RRC connected mode in the primary layer or using a secondary RRC connection, and/or a transition from RRC connected mode to idle mode (e.g., if induced by signaling received from the network) in the primary layer.

A WTRU in RRC IDLE mode in a primary layer and configured for layered connectivity may initiate an access using methods applicable to secondary connectivity when the WTRU is configured with secondary connectivity, e.g., if the configuration is valid and the WTRU determines that new data has become available for transmission in the uplink for a service and/or for a bearer applicable to secondary connectivity. An access may be initiated if the WTRU first determines that resources are available for secondary connectivity (e.g., the WTRU determines that the cell may be suitable for secondary connectivity, e.g., may be of sufficient radio link quality).

A WTRU in RRC IDLE mode in a primary layer and configured for layered connectivity may initiate an access using methods applicable to secondary connectivity when the WTRU is configured with secondary connectivity, e.g., if the configuration is valid and the WTRU receives signaling that indicates that it may start performing reception of downlink transmission. An access may be initiated if the WTRU first determines that resources are available for secondary connectivity (e.g., the WTRU determines that the cell may be suitable for secondary connectivity, e.g., may be of sufficient radio link quality).

A WTRU may operate according to CONNECTED mode behavior in a primary layer. The WTRU may support layered connectivity and may be configured with secondary access. This support may be indicated as part of a WTRU capability exchange with the eNB and may be configured to operate in parallel with layered connectivity.

The WTRU in RRC CONNECTED mode in the primary layer may receive control signaling that may configure one or more aspects of a secondary connection. The configuration may enable the WTRU to establish routing between a gateway that may handle traffic for the secondary layer.

The signaling may be L3 (e.g., RRC) signaling or higher layer (e.g., NAS) signaling, which may be transported in RRC PDUs or may use an IP from a configuration server. The WTRU may be configured for a secondary layer as part of an RRC Connection Reconfiguration procedure. An RRC or NAS procedure for configuring secondary connectivity may be used. A procedure may configure security for the secondary layer. The procedure may be successful when security is activated successfully. Security activation may be part of an initial configuration procedure or may be a separate procedure.

A configurable aspect of a secondary connection may be a control plane configuration, such as an identity of a control plane anchor (e.g., a Proxy-MME), an identity of the WTRU for the secondary layer (e.g., area-specific), applicable downlink frequencies, a list of an applicable physical cell identity or identities, mobility parameters for WTRU-autonomous mobility, whether there is cell-specific control signaling (e.g., such as system broadcast configuration), and/or WTRU-specific control signaling (e.g., such as using a secondary RRC connection) that may be applicable when accessing resources of a cell of a secondary layer.

Another configurable aspect of a secondary connection may be a security configuration, such as an identity of a security anchor (e.g., if different from the serving gateway for the secondary layer, it may be the control plane anchor, e.g., the Proxy MME) and/or security configuration, such as parameters including a security algorithm and/or keys.

Another configurable aspect of a secondary connection may be packet filters. The WTRU may receive a configuration that enables the WTRU to steer traffic (either as a flow or as individual packets) and/or services (either as a flow or a combination thereof) towards different layers (e.g., according to specific policies such as described herein).

Another configurable aspect of a secondary connection may be policies. The WTRU may receive a configuration that enables the WTRU to determine what area or areas, what cell or cells, and/or under what conditions (e.g., bit rate, amount of data, packet inter-arrival time, and/or other QoS-related thresholds) the WTRU may initiate transmissions to a secondary layer.

Another configurable aspect of a secondary connection may be a physical layer configuration. The WTRU may receive a configuration that provides, for example, default physical layer parameters and/or cell- or area-specific parameters for accessing resources of a cell of a secondary layer.

Another configurable aspect of a secondary connection may be routing parameters or a bearer configuration for a secondary layer. These may include, for example, an identity of a serving gateway or a routing configuration, e.g., including tunneling parameters. If these are not present in the configuration, the WTRU may obtain parameters using a procedure similar to a presence notification.

The WTRU may be configured for layered connectivity. The WTRU in RRC CONNECTED mode in the primary layer may receive control signaling that may reconfigure one or more aspects of a secondary connection, such as any subset or combinations of the aspects disclosed herein.

The configuration of the secondary layer may remain valid even when aspects of the primary layer configuration may be removed or invalidated, e.g., such as when moving to IDLE mode or in case of an impairment in the primary layer. The WTRU may consider the configuration for the secondary connectivity with little or no dependency from events occurring in the primary layer other than signaling that may add, modify, or remove such configuration. For example, such configuration may be considered as valid even when the WTRU performs a transition from the RRC CONNECTED mode to the RRC IDLE mode (or vice versa) for the primary layer.

Example of methods by which a WTRU may determine when to autonomously invalidate a configuration for a secondary layer when in RRC IDLE mode for the primary layer are described herein.

The WTRU in RRC CONNECTED mode in a primary layer and configured for layered connectivity may invalidate a configuration for a secondary layer when the WTRU initiates an RRC connection reestablishment for the primary layer, for example, when the WTRU fails the reestablishment procedure. The WTRU may invalidate a configuration for a secondary layer when the WTRU determines that it is detaching from the network or that it is no longer attached to the network for the primary layer. For example, the WTRU may initiate the detach procedure (e.g., turning off the WTRU, disabling EPS services, etc.) and send a DETACH REQUEST message. The WTRU may receive a DETACH REQUEST message from the MME for the primary layer. The WTRU may receive an EMM message from the MME, such as a SERVICE REJECT or a TRACKING AREA UPDATE REJECT with EMM cause "implicitly detached." The detach procedure may be for the secondary layer, in which case the WTRU may receive the message from the Proxy-MME. An EMM cause may be specific to the secondary layer, e.g., "implicitly detached secondary layer." If the ATTACH is layer-specific, the signaling may be applied independently for each layer.

The WTRU may invalidate a configuration for a secondary layer when the WTRU determines that it is no longer within coverage of a cell that supports layered connectivity.

The WTRU may invalidate a configuration for a secondary layer when the WTRU determines that it is within coverage of a cell that supports layered connectivity, but the cell may not match an aspect of the WTRU's configuration. For example, the cell may not support minimum criteria of the active services applicable to the secondary layer. For example, the cell may not be part of the same group and/or area as indicated in the WTRU's configuration for the secondary layer.

The WTRU may invalidate a configuration for a secondary layer when the WTRU determines that security has failed or that security could not be activated for the primary layer, e.g., upon failure of a secondary layer authentication procedure.

The WTRU may invalidate a configuration for a secondary layer when the WTRU receives a handover command that may indicate mobility to a cell that does not support layered connectivity and/or that may not be part of the same area, e.g., from the perspective of the control plane anchor.

The WTRU may invalidate a configuration for a secondary layer when the WTRU receives a configuration for the primary layer that, in combination with its configuration for a secondary layer, may exceed the total WTRU capabilities such that connectivity in one of the layers may be impaired. The WTRU may prioritize and apply the received configuration for the primary layer. The WTRU may initiate a procedure that indicates to the network that it may no longer be configured for secondary connectivity. This indication may be included in a presence notification.

The WTRU may invalidate a configuration for a secondary layer when the WTRU determines that it may not access the primary layer.

The WTRU in RRC CONNECTED mode in a primary layer and configured for layered connectivity may initiate an access using methods applicable to secondary connectivity when the WTRU is configured with secondary connectivity (e.g., if the configuration is valid) and the WTRU determines that new data has become available for transmission in the uplink for a service and/or for a bearer applicable to secondary connectivity. This may be done if the WTRU first determines that resources are available for secondary connectivity (e.g., the WTRU determines that the cell is suitable for secondary connectivity, e.g., of sufficient radio link quality).

The WTRU in RRC CONNECTED mode in a primary layer and configured for layered connectivity may initiate an access using methods applicable to secondary connectivity when the WTRU is configured with secondary connectivity (e.g., if the configuration is valid) and the WTRU receives signaling that indicates that it may perform reception of downlink transmission. This may be done if the WTRU first determines that resources are available for secondary connectivity (e.g., the WTRU determines that the cell is suitable for secondary connectivity, e.g., of sufficient radio link quality).

In some embodiments, a WTRU may be enabled to reconfigure one or more bearers between a primary layer and a secondary layer, and vice-versa. Such reconfiguration may be accomplished autonomously or via network control. Such reconfiguration may be used to implement service continuity. Reconfiguration may comprise re-assignment of a bearer, which is associated with a first layer, to a second layer. In an example network controlled reconfiguration procedure, reconfiguration from L3 and L2 (PDCP/RLC/MAC) may be performed with security continuity (i.e. without changing security). In another example, a procedure may re-associate the concerned EPS-Bearer(s) to a DRB with a configuration update. From an L3 and L2 perspective, in some embodiments an example WTRU-initiated procedure may be similar to an RRC Connection re-establishment procedure. One or more procedures may be combined with (or accomplished sequentially with, e.g., after) a presence notification procedure.

Reconfiguration may consist of the NAS layer re-assigning the concerned service(s) and/or data flow(s) to a bearer that may correspond to a different layer and/or a different QoS configuration. For example, this may occur if the use of a secondary layer is represented by a QoS Configuration Index (QCI).

ECM behavior may be enhanced, e.g. by implementation of a new ECM state and new state transitions, to enable access according to secondary layer principles. For example, an ECM-Inactive state, in addition to ECM-idle and ECM-connected states, may support multi-layer connectivity and other principles disclosed herein.

A WTRU may support connectivity according to layered connectivity principles and may be configured to operate in parallel with a secondary connection. Support may be indicated in a WTRU capability exchange with an eNB.

A new ECM state may enable a WTRU to operate (e.g. in a new or enhanced mode) while there is an established S1 signaling connection and an S1 bearer for the WTRU and/or for the concerned EPS bearer. Operation may be enabled with and without an associated RRC Connection and a configured DRB. When there is no RRC connection, a WTRU may implement one or more procedures enabling the network to manage the S1 connection, e.g. by a presence notification or path update procedure. Latency may be reduced by enabling such mode of operation. For example, latency may be reduced when the network and WTRU use the mode of operation to maintain an ECM connection when the WTRU has extended transmission inactivity.

In some embodiments, a new ECM inactive state may have at least one of the following characteristics: a WTRU may have an ECM Connection, e.g. an established NAS signaling connection; a WTRU may have been assigned network resources, e.g., S1 signaling connection and/or S1 bearer(s); and a WTRU may not have been assigned physical radio resources, e.g., Data Radio Bearer(s) (DRB) and/or Signaling Radio Bearer(s) (SRB) via an RRC connection. An inactive state may be maintained so that an ECM connection may resume once the L2 transport path is re-established between the WTRU and the network ECM endpoint (e.g. the MME).

Information may be maintained in a WTRU to support operation. For example, provisioned values and values obtained when last in ECM-Connected state may be maintained. In some embodiments, in addition to already provisioned values (e.g. IMSI, LTE K) a WTRU may maintain (in support of an ECM-inactive state) current values for at least one of "APN in use", "GUTI", "TAI" and "NAS Security Context," which may have been obtained during a previous ECM-Connected state.

A subset of an NAS state maintained during transitions to ECM-IDLE state may also be maintained in support of an ECM-inactive state. For example, a WTRU may maintain at least one of TAI List, WTRU IP address and Used APN-AMBR(UL). A subset of an NAS state kept when moving to ECM-CONNECTED state may also be maintained by a WTRU. For example, a WTRU may maintain one or more aspects of the configuration of a transport bearer, such as TFT, QCI and EPS Bearer ID.

As discussed below, a WTRU may maintain additional state information related to the RRC protocol.

Information maintained in support of an ECM-inactive state may depend on L3 modeling of the ECM-inactive state, e.g., whether it represents a transient state or a static state in which the WTRU may remain even when actively transmitting. Information or aspects maintained may depend on modeling used for L2 transport when using such mode of operation. For example, relevant information may depend on whether a dedicated or shared EPS bearer is used to transport user plane data.

A WTRU may transition from an ECM-Connected state to an ECM-Inactive state. In some embodiments, this transition may occur (i.e. be triggered) in response to one or more events. One event may be a network controlled event, such as reception of signaling from an eNB. For example, the eNB may detect low activity or a period of inactivity by a WTRU. The WTRU may transition to the ECM-Inactive state when it receives control signaling, such as L3/NAS signaling. In some embodiments, such signaling may additionally trigger a transition to the RRC-Inactive state. In other words, ECM and RRC may have a direct relationship.

A WTRU may transition from an ECM-Connected state to an ECM-inactive state in response to an RRC-Inactive state or signaling therefor. The WTRU may autonomously transition to the ECM-Inactive state when it determines that it may move to an RRC-Inactive state. For example, the WTRU may receive control signaling, such as L3 signaling that releases an RRC Connection. Such signaling may include an indication that the WTRU may move to the ECM-inactive state instead of the ECM-IDLE state.

A WTRU may transition from an ECM-Inactive state to the ECM-Connected state. In some embodiments, this transition may occur in response to an RRC-connected state or signaling therefor. In other words, ECM and RRC may have a direct relationship. For example, a WTRU may transition to the ECM-Connected state when it determines that it is in RRC Connected state.

A WTRU may transition from an ECM-Inactive state to the ECM-Connected state in response to the WTRU initiating an NAS Service Request. For example, the WTRU may initiate a transition to the ECM-Connected state when it performs a NAS service request for a service that is not applicable to secondary layer access principles.

A WTRU may transition from an ECM-Inactive state to an ECM-Idle state. In some embodiments, this transition may occur in response to an RRC-idle state or signaling therefor. In other words, ECM and RRC may have a direct relationship.

A WTRU may transition from an ECM-Inactive state to an ECM-Idle state in response to expiration of an inactivity timer. Such timer may be first started when the WTRU enters the ECM-Inactivity state. The inactivity timer may be restarted when the WTRU successfully completes a presence notification/routing update procedure or when the WTRU successfully performs a transmission.

A WTRU may be enhanced, e.g. by implementation of a new RRC state and new state transitions. A WTRU may support connectivity according to layered connectivity principles and may be configured to operate in parallel with a secondary connection. Support may be indicated in a WTRU capability exchange with an eNB. For example, an RRC-Inactive state, in addition to RRC-idle and RRC-connected states, may support multi-layer connectivity and other principles disclosed herein.

A new RRC state may enable a WTRU to operate (e.g. in an enhanced mode) while there is an established S1 signaling connection and an S1 bearer for the WTRU and/or for the concerned EPS bearer. Operation may be enabled with and without an associated RRC Connection and a configured DRB. When there is no RRC connection, a WTRU may implement one or more procedures enabling the network to manage the S1 connection, e.g. by a presence notification or path update procedure. Latency may be reduced by enabling such mode of operation. For example, latency may be reduced by enabling a mode of operation whereby the network and the WTRU maintain a valid security association/context and a valid bearer configuration even during prolonged transmission inactivity.

A WTRU may implement a new RRC state, e.g., an RRC-inactive state, using a configuration for performing one or more procedures associated with the new state. An example configuration may comprise parameters for an uplink synchronization channel when such a channel is defined. Configuration may comprise scheduling parameters, e.g., RNTI, for resources available in an RRC-inactive state, e.g., resources such as CB-PUSCH, dynamic scheduling of resources for synchronization channel. Configuration may comprise L3 connection identity. Configuration may comprise security context and identity.

A new RRC state, e.g. RRC-inactive state, may be maintained so that an RRC connection may resume or a new RRC connection that reuses at least some of the state from the previous RRC connection may be established once the L2 transport path is re-established between the WTRU and the network S1-u endpoint. This may reduce latency.

The new state may maintain a Bearer Configuration similar to a CONNECTED state. Such state may include the useful aspect for the configuration of a transport bearer, e.g., EPS Bearer ID. Such state may also include one or more aspects useful for the configuration of a radio bearer (SRB and/or DRB).

Information/aspects maintained in support of an RRC-inactive state may depend on L3 modeling of the RRC-inactive state, e.g., whether it represents a transient state or a state in which the WTRU may remain even when actively transmitting. For example, a transient state may speed up the transition from inactive to CONNECTED, e.g., by transitioning to CONNECTED upon starting transmission of data. A static or fixed state may not immediately transition to a CONNECTED state. Information or aspects maintained may depend on modeling used for L2 transport when using such mode of operation. For example, relevant information may depend on whether a dedicated or shared EPS bearer is used to transport user plane data.

The new, e.g., Inactive, state may comprise an AS security context. An AS security context may be used to derive a new key, as a context to resume or for consideration of a shared bearer.

The new, e.g., Inactive, state may comprise an ECGI (Cell Group Identity). An ECGI may be useful if the modeling of the maintenance of the transport layer connectivity for such mode of operation is based on knowledge of the WTRU's location at the cell (or eNB) level. In such a case, the WTRU may keep the L2 transport updated, e.g., using the presence notification/routing update procedure.

The new, e.g., Inactive, state may comprise some aspects related to scheduling, such as a valid Radio Network Temporary Identifier (RNTI) or C-RNTI. For example, an RNTI may be used for transmissions on shared resources using contention (e.g. a CB-RNTI for contention-based PUSCH transmissions). The WTRU may use such RNTI to access resources of the cell using secondary layer connectivity for transmission of applicable data.

The new, e.g., Inactive, state may comprise aspects related to physical layer configuration.

State transitions to and from the new state, e.g., RRC-Inactive state, may follow the same or similar logic for the corresponding new ECM state (e.g. ECM-inactive state) described above. In some embodiments, the same triggers for transitioning to/from ECM-Inactive state may be applicable for transitioning to/from an RRC-Inactive state.

A WTRU may transition from an RCC-connected state to an RCC-Inactive state. In some embodiments, this transition may occur in response to network control, such as reception of signaling from the eNB. For example, the WTRU may receive control signaling, such as L3 signaling, that releases the RRC Connection. Such signaling may comprise an indication that the WTRU may move to the RRC-inactive state instead of the RRC-IDLE state.

A WTRU may transition from an RCC-inactive state to an RCC-connected state. In some embodiments, this transition may occur in response to a new service request. The WTRU may initiate a transition to RRC CONNECTED when a new service for which associated data is not applicable for transmission using the secondary connectivity is requested by the upper layer. This may occur, for example, when such new service triggers a NAS Service Request.

A WTRU may transition from an RCC-inactive state to an RCC-connected state in response to UL Data Arrival. The WTRU may initiate a transition to RRC CONNECTED when new data that is not applicable for transmission using the secondary connectivity becomes available in the WTRU's buffer. This may occur, for example, when such data triggers a BSR.

A WTRU may transition from an RCC-inactive state to an RCC-connected state in response to DL Data Arrival. The WTRU may initiate a transition to RRC CONNECTED when it receives an indication from the network that it may establish an RRC connection. Such indication may be based on paging reception. An explicit indication may be inside a paging message. An indication may also be based on separate sets of paging occasions for each layer. An indication may also be based on (e)PDCCH reception, such as an order to perform random access (e.g. DCI format 1A for random access order) using a specific RNTI.

A WTRU may transition from an RCC-inactive state to an RCC-connected state in response to a TAU Request. The WTRU may initiate a transition to RRC CONNECTED when it determines that it may perform a TA procedure, e.g., for the primary layer.

A WTRU may transition from an RCC-inactive state to an RCC-connected state in response to an inactivity timer. The WTRU may initiate a transition to RRC CONNECTED when it determines that an inactivity timer has expired. Such timer may be started when it enters or reenters the Inactivity state. The timer may be restarted, for example, when the WTRU successfully completes a presence notification/routing update procedure, when the WTRU successfully performs and/or receives a transmission, or when the WTRU successfully receives downlink control signaling applicable to the secondary connection. The WTRU may transition to CONNECTED mode and the network may determine whether the WTRU may transition back to RRC-Inactive or RRC-Idle mode.

A WTRU may transition from an RCC-inactive state to an RCC-connected state in response to a Presence Notification/routing update. The WTRU may initiate a transition to RRC CONNECTED when it determines that it may perform the presence notification/routing update procedure, e.g., when the procedure requires the establishment of an RRC Connection. For example, a WTRU may be configured to keep routing and L2 connectivity up-to-date. Such maintenance may be performed before any data is sought for transmission using a secondary connection.

A WTRU may remain in an RCC-inactive state, i.e., loop transition from an RCC-inactive state to an RRC-inactive state. In some embodiments, this loop transition may occur in response to cell selection or reselection of a cell suitable for secondary access. A cell suitable for secondary access may be, for example, a cell that supports secondary access, a cell in a list of cells and/or a cell that is part of a group/set of cells defining an area for which a secondary access configuration is valid. The WTRU may determine characteristics of a cell. The determination may be based on broadcast system information or information received for the cell together with the configuration of the secondary access.

A WTRU may remain in an RCC-inactive state, i.e., loop transition from an RCC-inactive state to an RRC-inactive state. In some embodiments, this loop transition may occur in while an Inactivity Timer is running. The timer may be started when the WTRU enters or re-enters the Inactivity state. The timer may be restarted, for example, when the WTRU successfully completes a presence notification/routing update procedure, when the WTRU successfully performs and/or receives a transmission or when the WTRU successfully receives downlink control signaling applicable to the secondary connection.

A WTRU may transition from an RCC-inactive state to an RCC-idle state. In some embodiments, this transition may occur in response to expiration of the validity, i.e., invalidation, of the configuration of the secondary access or removal of the configuration. More generally, the WTRU may transition to the RRC IDLE state when it determines that it no longer operates according to a configuration for secondary access.

A WTRU may transition from an RCC-inactive state to an RCC-idle state in response to a failure to perform cell reselection, forward mobility, presence notification/routing update or selection of a cell that does not support layered connectivity access. The WTRU may transition to the RRC IDLE state when it determines that it no longer operates in a cell that supports secondary access.

A WTRU may transition from an RCC-inactive state to an RCC-idle state in response to a failure to operate with a secondary access. The WTRU may transition to the RRC IDLE state when it determines that the radio link quality is below a threshold, when it experiences radio link problems, when DL RLF occurs (e.g. HARQ failure, L1 out-of-synch) or when UL RLF occurs (e.g. reaching maximum number of HARQ retransmissions, RLC failure, unsuccessful random access). The WTRU may transition to the RRC IDLE state when it determines a failure to acquire and/or maintain uplink synchronization.

A WTRU may transition from an RCC-inactive state to an RCC-idle state in response to an inactivity timer. The WTRU may transition to the RRC IDLE state when it determines that an inactivity timer has expired. The timer may be started when the WTRU enters or re-enters the Inactivity state. The timer may be restarted when the WTRU successfully completes the presence notification/routing update procedure, when the WTRU successfully performs and/or receives a transmission, or when the WTRU successfully receives downlink control signaling applicable to the secondary connection.

A WTRU may transition from an RCC-inactive state to an RCC-idle state in response to the WTRU initiating a Power off.

A WTRU may select or reselect cells in an RRC-Inactive state. This may occur by way of control signaling. For example, the WTRU may receive control signaling that configures a secondary access and/or that indicates to the WTRU that it may initiate the transition from RRC CONNECTED to RRC-Inactive state. Such control signaling may include information about cells applicable for this Inactive state, which may lead to a cell selection or reselection procedure. For example, the control signaling may be inside an information element. An information element may be similar to, for example, idleModeMobilityControlInfo. The information element may indicate priority information for the cell reselection procedure.

In some embodiments, the WTRU may use the priority indicated to determine during (or after) the cell reselection procedure whether or not the selected cell supports the secondary layer access and/or the WTRU in ECM/RRC-Inactive state. If the cell does not support the access type, the WTRU may initiate a transition to another state, e.g., RRC-IDLE. This may occur if a timer invalidates the secondary layer configuration. If the cell does not support the access type, the WTRU may initiate a transition to the CONNECTED state. In such a case, the WTRU may be reconfigured explicitly without secondary layer access.

The WTRU may exchange control signaling with an eNB in the secondary layer (e.g., secondary RRC connection) to access radio resources under the control of the eNB. The radio resources may be utilized for the transmission and/or reception of user data, for example, to or from a gateway and for the transmission and/or reception of control information to or from a proxy MME.

Control signaling may establish a control plane connection for the secondary layer. The secondary RRC connection may exist independently of any RRC connection in the primary layer, e.g., it may exist even if the WTRU is in RRC IDLE mode in the primary layer.

The secondary RRC connection may be associated with a secondary RRC configuration maintained by the WTRU and the eNB to determine resources that may be accessed and associated parameters. The resources and parameters may pertain to the physical layer (e.g., for power control, reference signals, and/or physical channel configuration), MAC, and RLC and PDCP if such protocols are utilized in the secondary layer. The secondary RRC configuration may allow for a logical channel for the transmission and reception of data and a logical channel for transmission and reception of control information. There may be a logical channel for the transmission and reception of control information for each network entity to or from which the information is destined or originates.

The WTRU may establish a secondary RRC connection using a procedure similar to the establishment of an RRC connection in a primary layer. A secondary RRC message may include a payload for communication between the WTRU and another network entity such as the gateway and/or the proxy MME. The payload may be forwarded to or from the network entity, for example, based on an identity or address included as part of the message, without being interpreted by the eNB.

The WTRU may release a secondary RRC connection based on signaling (e.g., explicit signaling) from the network or from detection of radio link failure using criteria similar to that used for the detection or radio link failure in the primary layer. The WTRU may autonomously release a secondary RRC connection if a timer expires. The timer may be started or restarted when the WTRU receives or transmits control information or data. Upon releasing a secondary RRC connection, the WTRU may release the associated RRC configuration.

The WTRU may provide an indication of its capabilities (e.g., maximum bandwidth, data rates, antenna ports, and/or supported features) as part of the initial message requesting establishment of the secondary RRC connection or implicitly by the selection of a specific resource for accessing the cell (e.g., PRACH preamble). The indication may comprise an index to a table entry. The selected index may be the one corresponding to the highest capabilities among the subset of entries for which the WTRU meets one or more, or all, the capabilities. This approach may allow the eNB to quickly determine an appropriate configuration for the WTRU without large signaling exchanges between the WTRU and eNB or between the proxy MME and the eNB. The table may be predefined. The table may have been provided upon setting up the configuration of a secondary layer by the MME (e.g., in the primary layer).

Control signaling may comprise stateless request-response type signaling between a WTRU and an eNB.

For example, such signaling may comprise a presence notification request and/or procedure as disclosed herein, e.g., such that a WTRU that enters a cell in which it has not performed any transmissions either for data and/or control plane signaling since a last transmission using the resources of a different cell or since a certain amount of time in any cell may enable the network to determine the location of the WTRU.

Signaling may include a dedicated resource configuration request, such that the WTRU may be configured with resources that may be accessed and associated parameters. The resources and parameters may pertain to the physical layer (e.g., for power control, reference signals, and/or physical channel configuration), MAC, and RLC and PDCP if such protocols are utilized in the secondary layer. For example, the WTRU may perform a request if the WTRU does not have a valid configuration for accessing common, cell-specific resources (if any) either from the initial configuration (e.g., for an area-specific configuration or for a cell-specific configuration) for the secondary layer or as received on a broadcast channel (e.g., for cell-specific configuration) for the concerned cell.

Signaling may be exchanged using a common control channel, such as SRB0 (e.g., over the CCCH logical channel, without security activation), for example, for signaling towards the eNB over RLC/MAC. Such signaling may include a short MAC-I for authentication purposes.

Such signaling may supersede one or more configuration aspects, e.g., from the time the WTRU receives such configuration and until the WTRU may determine that the configuration may no longer be valid. The WTRU may determine that a configuration is no longer valid when it selects a different cell, when it performs a presence notification procedure, and/or after a certain period of time has elapsed.

The WTRU may receive WTRU-specific parameters for its secondary connection (e.g. following the transmission of a presence notification) and/or cell-specific parameters for its secondary connection. In one embodiment, the WTRU may receive one or more configuration aspects for its secondary connectivity as part of system information broadcast. One configuration aspect may comprise an indication of support for secondary connectivity. For example, the WTRU may determine that the cell supports secondary connectivity by detecting the presence of information related to such connectivity, e.g., from the presence of a system information block (SIB) in the received system information. Another configuration aspect may be default physical layer configuration. Another configuration aspect may be configuration parameters for contention-based access, e.g., CB-RNTI for contention-based PUSCH. Another configuration aspect may be configuration parameters for a cell-specific uplink synchronization channel.

L2/PHY access procedures may be performed independently of an RRC state in the primary layer. For the user plane, techniques described herein may be deployed so that transmission of user plane data occurs independent of the RRC state, e.g., without an RRC connection. Techniques may also be deployed so that the L2 transport path, perhaps including the S1 connection, may be re-established or updated as necessary, e.g., using techniques described below.

L2 protocols may be modeled as an extension of single connectivity or dual connectivity. Regarding modeling as an extension of single connectivity, in one embodiment, the WTRU may be active in any given time with a single connectivity layer. For example, the WTRU may be in IDLE mode in a primary layer while it may be configured for secondary connectivity. In this case, the WTRU may implement a single MAC entity with a single set of HARQ processes for downlink reception and uplink transmissions. In an example implementation, a transition from RRC-Inactive to RRC CONNECTED mode may trigger behavior similar to handover for L2 protocols where, for example, RLC may be reset, PDCP may be re-established and MAC may be reset. Such L2 reconfiguration may also include transmission of PDCP SR, such as when bearers are resumed after completion of the establishment of the RRC CONNECTION. In another example, the WTRU may first transition to the RRC IDLE mode before establishing an RRC connection when it performs a transition from RRC-Inactive to RRC CONNECTED mode.

Regarding modeling as extension of dual connectivity, the WTRU may be active with a plurality of layers concurrently. For example, the WTRU may be in RRC CONNECTED mode in a primary layer while it may be configured for secondary connectivity. The WTRU may implement one MAC entity per layer, each with its own set of HARQ processes for downlink reception and uplink transmissions. The WTRU may receive control signaling that reconfigures the WTRU with a single layer, in which case the WTRU may trigger behavior similar to handover behavior for L2 protocols, except for the applicable bearers and MAC entity associated with the secondary connection.

Transport layer connectivity may be maintained. In one embodiment, secondary connectivity and latency-reduction benefits may be realized by a mode operation whereby the network maintains a data path for an inactive WTRU. The L2 transport may be realized according to one or more of a dedicated S1 transport (with or without X2 forwarding in RAN) and shared S1 transport (with or without X2 forwarding in RAN).

The data path may be managed in terms of the WTRU's location at the granularity of the cell, the eNB or of a plurality thereof, e.g., a Tracking Area (TA). Granularity may depend on how the network keeps track of the WTRU's location. Granularity may depend on the method used to obtain the WTRU's location information. For example, the network may be informed of the WTRU's location according one or more methods. A first method of determining location may be based on transmissions of keep-alive signals from the WTRU, whether periodic or not. Location determinations may also be based on the WTRU registration procedure, e.g. at every change of cell. A cell change may be a consequence of WTRU autonomous mobility using a forward handover mechanism or a consequence of a cell reselection procedure that leads to the selection of a different cell. Location determinations may also be based on a presence notification/routing update procedure, e.g., when the WTRU has data to transmit. Location determinations may also be based on a tracking area update (TAU). Regardless of technique(s), the resulting information may be used by the network to update routing for data to, or from, a given WTRU.

Routing may be realized based on CN routing, e.g., S1 termination, by applying principles of single connectivity (SC) or dual connectivity (DC) with SCG bearers. For example, the network updates the S1 connection, which may include the S1 Signaling Connection (S1-C) and one or more S1 bearer(s) (S1-U).

Routing may be realized based on RAN routing, e.g., X2 tunneling, by applying principles of single connectivity (SC) or dual connectivity (DC) with MCG bearers. For example, the WTRU maintains an RRC context associated with an MeNB. This may hide much of the WTRU's connectivity, whether active, inactive or intermittently active, from the MME and the core network. In accordance with principles of DC, the S1-c for the WTRU may remain terminated at the MeNB. Methods to update and manage X2 connectivity while maintaining S1 may correspond to NW topology, e.g., DC architecture 1A vs. 3C.

The WTRU may inform the network of its presence or location in the secondary layer. The network may receive the notification and may update the routing for the WTRU.

A presence notification may be a procedure, a message sent by the WTRU in the uplink, and/or data sent by the WTRU in the uplink. The presence notification may indicate the cell that the WTRU may be camped on or connected to. The WTRU may report the cell that may be accessible for its secondary layer connectivity.

The network may use and/or store the information received in the presence notification, such that it may determine how to reach the WTRU in case of downlink data arrival for data applicable to the secondary layer. The network may use the presence notification received by a WTRU to initiate a routing update and/or a path update. Transport of user data for the WTRU may be possible between the WTRU and the gateway.

The presence notification may be used by the eNB to initiate the setup of a tunnel between a gateway and the eNB. The presence notification may be used to update the network of the WTRU location (e.g., location area or tracking area) or to send an IP message to the gateway for proper routing.

For uplink data transmission, the WTRU may use presence notification to perform uplink data transmission and/or to update the routing information in the network, e.g., simultaneously or prior to uplink data transmission.

Presence notification may be triggered by the WTRU, for example, when uplink data arrives, e.g., for a service mapped to a secondary layer. The WTRU may trigger presence notification as a result of a mobility event applicable to the secondary layer. The mobility event may be WTRU-autonomous, e.g., cell selection or reselection. The mobility event may involve selection of a new target cell. The mobility event may involve selection of a new target cell that may belong to a different area than the last cell the WTRU was camped on or connected to. The area may correspond to a tracking area, a serving gateway area, an MME light area, and/or any other area that may be defined.

The presence notification may be triggered by the WTRU as a result of a downlink initiated request, e.g., paging or reception of downlink data or any routing update request message.

The presence notification may be triggered by the WTRU as a result of downlink data reception over an eNB, e.g., in the case of the first transmission for the secondary layer for the WTRU in the cell or the first transmission for the secondary layer for the WTRU in the cell since a certain amount of time as elapsed. The presence notification may be triggered if the WTRU has not already performed a procedure that resulted in the WTRU's location being known to the network, e.g., at least not since a certain amount of time has elapsed.

The presence notification may comprise a WTRU-specific identifier, an authentication token (e.g., a short MAC-I), and/or a gateway tunnel endpoint ID (TEID) stored in the WTRU. The presence notification may comprise the identity of the last connected MME (or Proxy-MME) or gateway (e.g., GW ID) or Gateway address. This information may be sent in the presence notification upon detection of a location area update (e.g., tracking area) or a gateway area update. The presence notification may comprise an indication of why the message was triggered (e.g., UL data transmission, path update request from network, path update request from network for DL data transmission, and/or reception of DL data). The presence notification may comprise a mobile IP binding update message. The presence notification may comprise the APN address so the network can create a GTP-U with the APN.

The presence notification message may comprise a control message transmitted to the network and/or data that may be transmitted (e.g., immediately) to the eNB. The UL message may correspond to an RRC message that may notify a serving eNB and perform a path notification/update. The RRC connection request may indicate the reason of the request and provide some of the information disclosed herein and indicate that the WTRU is performing a path update.

A MAC Control element may be used to initiate this UL transmission/notification. A connection request MAC control element may be used to indicate that the WTRU wants to initiate data and/or perform a path update. For example, the MAC control element may contain the available gateway tunnel endpoint ID provided to the WTRU and/or the gateway (GW) identity. A NAS message (for example, transmitted to a Proxy-MME) may be used to provide this information and perform a path update. An IP message may be used. Some information may be appended to the L2 message to inform the eNB where to route the information.

The WTRU may start UL data transmission to the selected eNB. The receiving GW may identify the WTRU and may know to which GW the data may be routed. The WTRU together with the UL data may indicate some of the information to the eNB, which may include the GW TEID and/or the GW ID or gateway address. This information may be conveyed in the MAC header or may be encapsulated in a higher layer signal. The WTRU may append this information to any (or all) of its UL data transmissions until a confirmation message from the network is received. The WTRU may send this information with one or more initial data transmissions and then continue normal data transmission. If no UL data is available, this may be performed by transmission of a dummy UL packet.

For UL initiated data transmission, the WTRU may start and/or continue UL data transmission. The WTRU may wait for a response from the network that the path switch (e.g., binding) has been performed prior to continuing with UL data transmissions. The WTRU may continue UL data transmission as long as it has a connection to the eNB and until the eNB tells it to stop.

Figure 3:
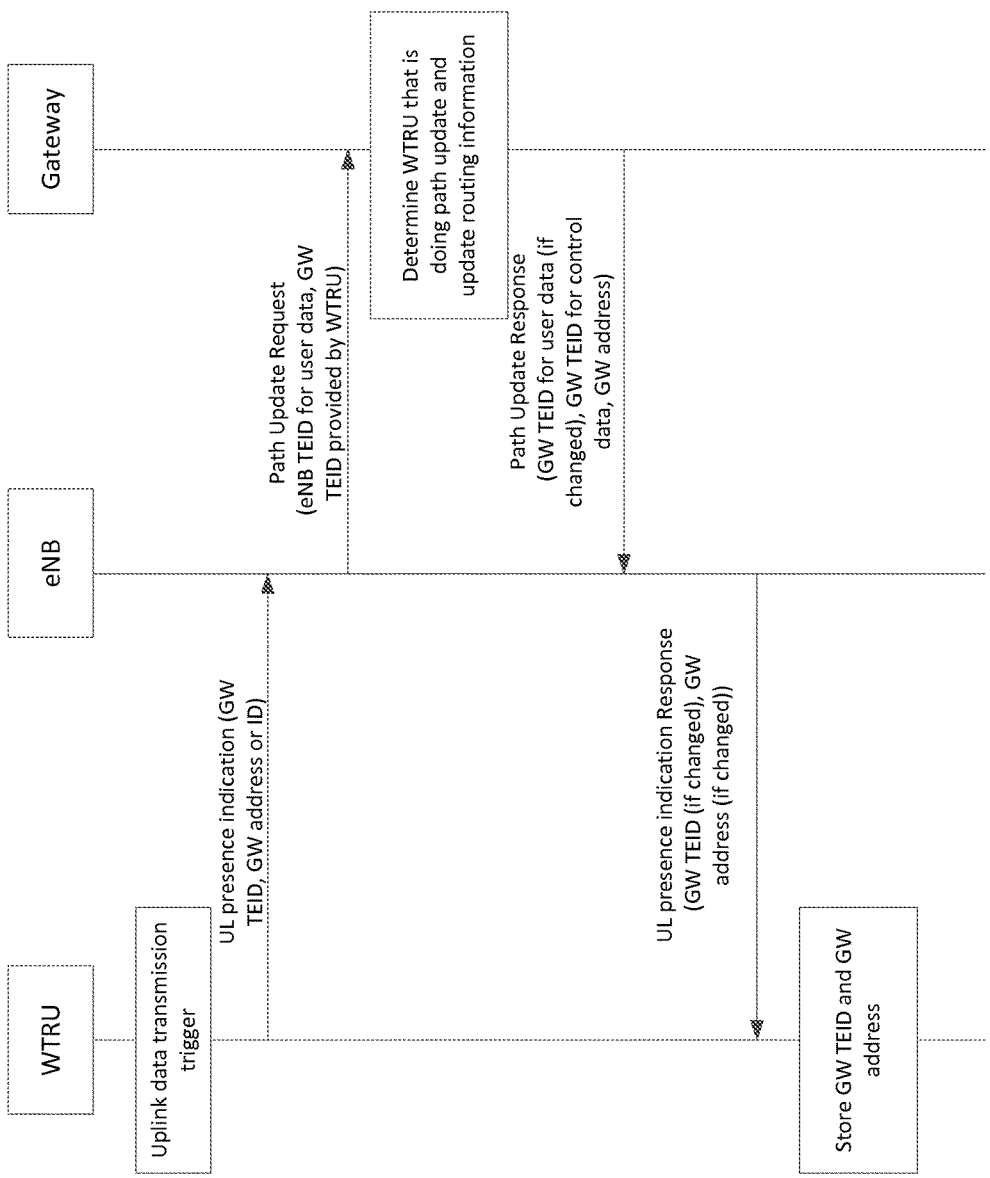
FIG. 3 illustrates an example call flow for presence notification, consistent with embodiments.

FIG. 3 illustrates an example call flow for presence notification. A target eNB may receive a presence notification (e.g., path switch request) message and may determine that the UL transmission may correspond to a path switch message for a WTRU that may be already connected to the network. This may trigger the eNB to initiate a routing update or a tunnel establishment procedure with the gateway.

The target eNB using the information received in the message may contact its serving GW or its MME (or Proxy-MME) and provide the GW tunnel endpoint ID (TEID) to identify the WTRU and may include the MME (or Proxy-MME) ID or GW ID that was provided by the WTRU. This information may, for example, be provided to the gateway over a new control message to the gateway (e.g., path update request). The path update request may include the GW TEID (e.g., provided in the UL presence indicator), which was assigned for the bearer established with the WTRU over the previous connection. The eNB may create and provide in the path update request message an eNB Tunnel Endpoint ID that may be used to transmit any subsequent DL data for the given WTRU.

Upon reception of a path switch request message, the GW may update its routing tables or tunnel ID endpoints and use those for any subsequent messages transmitted to that WTRU. The GW may provide back a message to the eNB or to the WTRU providing a new GW Tunnel End Point ID (if it changes) or a new GW ID (if it changes). A failure message may be generated and sent to the WTRU.

The network may determine whether it has up-to-date information by relying on the WTRU to update at every cell location; however, this may not be desirable for some architectures. The network may rely on the WTRU to update at every location area update (e.g., the network may know at least the WTRU location in a location area). The gateway may know the WTRU location based on the latest received path update. The gateway may assume the eNB specific location of the WTRU to be valid according to, for example, a timer-based mechanism (e.g., the location information is valid until a certain period of inactivity has elapsed) and/or an indication from an eNB or a Proxy-MME or an MME that the WTRU is an idle, inactive, or off state with a secondary layer. The gateway may assume (e.g., may always initially assume) that the last location is still valid. The gateway may send pings or may request periodic location updates.

The gateway may contact the WTRU to request a presence notification message or a WTRU location update request. This may be initiated, for example, upon reception of DL data and/or upon a determination that the gateway may not have up to date location information for the WTRU or upon a determination that the WTRU is in an idle mode. The examples disclosed herein may be used individually or in any combination.

Figure 4:
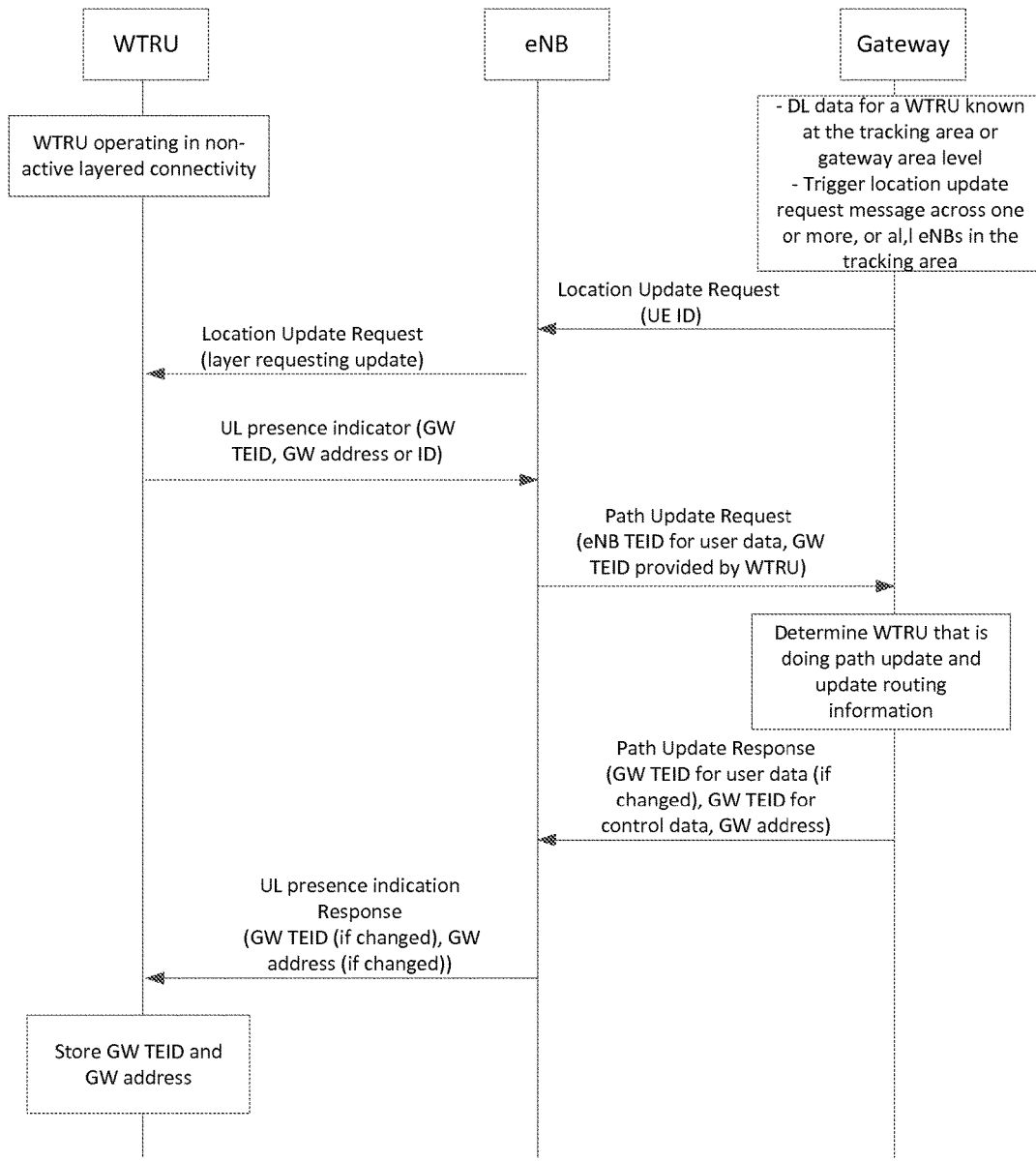
FIG. 4 illustrates an example message flow that may be sent over a secondary layer, consistent with embodiments.

FIG. 4 illustrates an example message flow that may be sent over the secondary layer. At least one data packet may be sent from a gateway to the eNBs that are part of the last known or reported location area or tracking area. The gateway may transmit one or a limited number of packets and may wait to receive a path update message from one of the eNBs to continue transmission of the remaining data. Upon receiving the path update request message from an eNB, the network may update the routing path and may continue data transmission over the corresponding eNB.

Figure 5:
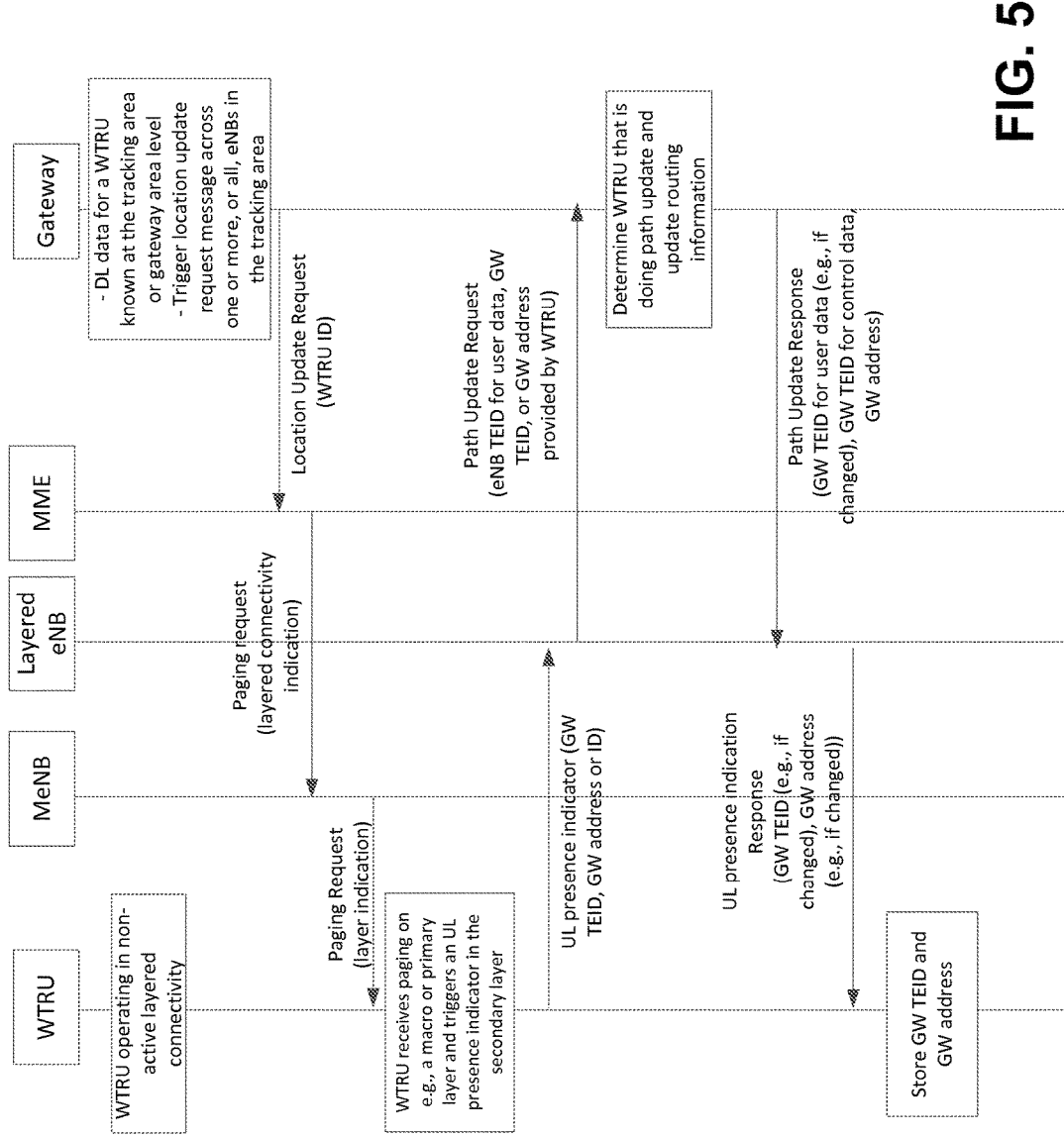
FIG. 5 illustrates an example message flow for layered connectivity that may be sent over a primary layer, consistent with embodiments.

A DL message requesting the WTRU to report its location may be triggered and transmitted over the secondary layer. FIG. 5 illustrates an example message flow for layered connectivity that may be sent over the primary layer. The gateway may generate a request to the eNBs associated with the last reported location area to send a DL message or a paging request for the given WTRU. For example, the gateway may send a WTRU location update request to the eNBs in the tracking/location area of the WTRU. The location update request message may comprise the WTRU identity and/or a potential GW TEID that may be used for that WTRU.

A gateway message (e.g., IP message) may be created and sent to the eNBs in the location area. The eNBs may transparently forward this message to the WTRU in a transmission opportunity used for WTRUs that are not connected to the cell (e.g., a paging opportunity).

Upon reception of a location update request for a WTRU not connected to the eNB or upon reception of a DL data packet over a common tunnel (e.g., not over a WTRU-specific bearer), for an unknown WTRU, the eNB may trigger the transmission of a paging like message to find the WTRU. This message may be an RRC message (e.g., an RRC location update request). A paging message may be used that may have a cause added, such as a path update request. The DL paging message transmitted to the WTRU may contain the tunnel ID and or the GW ID that the WTRU may echo back in the UL presence indication message.

In some embodiments, perhaps from the WTRU's perspective, a "layered eNB" may correspond to a configuration aspect, for example, one or more serving cells that are associated to a secondary layer in the WTRU's configuration. Such cells may be grouped as a cell group and/or may be associated to a secondary MAC instance. From the network's perspective, the "layered eNB" may correspond to a node that may be capable of interaction with an MME that can connect to the MeNB (e.g. for coordination of EPS bearers and/or for other CN control plane functions) and/or may be capable of inter-eNB signaling with the MeNB for RAN control plane functions (e.g. RRM, RRC configuration, and/or access control).

The WTRU may be paged and contacted over the primary layer. If the WTRU is connected to a primary layer, the primary layer may be used to trigger the WTRU to send a presence notification using the secondary layer. The gateway may send a message to the MME to request a path update message or a connection request message. The MME may use a paging message (e.g., a legacy paging message) to request the WTRU to establish a connection to a secondary layer. The message may indicate that the request is for the WTRU to activate a secondary layer and send an uplink presence indication message to the secondary layer. The message may be used to indicate that the request is for a service mapped to the secondary layer. The MME (or Proxy-MME) may send a new request message that may be used to trigger a path update message for the WTRU. The MME (or Proxy-MME) may send the request or paging message to the eNB (e.g., either one or more, or all, eNBs in the tracking area (or location area) or the eNB to which the WTRU is connected in case of connected mode).

Upon reception of the request, an eNB in the primary layer may initiate a paging request message (e.g., in case the WTRU is in idle mode) or may send a message over the dedicated connection if the WTRU is in connected mode over the primary layer.

The paging request message may indicate that the paging is to trigger an UL presence indication message (e.g., to initiate a connection to the secondary layer).

If the WTRU is in a connected mode, an RRC message may be used to tell the WTRU to initiate a secondary layer connection (e.g., a location update request on a secondary layer). An RRC reconfiguration message may be used for this purpose.

Upon reception of a paging reception or presence notification request, the WTRU may initiate one or more measurements on a secondary layer (e.g., if the secondary layer is deactivated). The WTRU may select the best cell detected in that layer (e.g., subject to configuration parameters and offset), for example, if a cell is not already selected. The WTRU may initiate a presence notification procedure.

If no suitable cells are found or the presence notification procedure failed (e.g., the transmission of the presence notification was unsuccessful and/or the WTRU did not receive a response within a certain amount of time), the WTRU may initiate an uplink RRC connection request over the primary layer. The WTRU may indicate failure to detect a cell in the secondary and/or may indicate the service that can no longer be served in the secondary layer. The WTRU may initiate an UL message (e.g., if it is already connected to the macro cell) to indicate failure. The WTRU may send a NAS response message.

The WTRU may have a security context, and may be considered security activated, for a secondary layer even in the absence of an established RRC connection in the primary layer or even in the secondary layer, if used. The secondary layer may support authentication of the WTRU by the network and/or of the network by the WTRU, encryption of user plane and/or control plane data, and/or integrity protection of control plane data.

The security functions may be supported by key material derived by the WTRU and the network at least upon configuration of multi-layer access (e.g., initial configuration or reconfiguration).

Upon configuration of multi-layer access, the WTRU may determine at least one key, which may be a secondary layer master key ($K_{MSL}$) that may support security functions in the secondary layer. The key $K_{MSL}$ may be used, for instance, for deriving other keys used for encryption or integrity protection of certain types of data (such as user data or for control). The $K_{MSL}$ key may be stored in a network entity responsible for control and security functions in the secondary layer. Such entity may be logically separated from the MME and may be a Proxy MME. The Proxy MME may be the same node as the gateway.

The $K_{MSL}$ key may be determined to be identical to the key $K_{ASME}$ used to support security functions in a primary layer. The key $K_{ASME}$ may be transferred from the MME to the proxy MME using a secure signaling mechanism. The WTRU may update the $K_{MSL}$ key whenever the $K_{ASME}$ key is updated.

The $K_{MSL}$ key may be derived from the $K_{ASME}$ key and another key. The $K_{MSL}$ key may consist of an NH parameter based on a previous NH parameter (or a $K_{eNB}$) using an NH derivation function. The previous NH parameter may be the most recently derived NH parameter in the primary layer. The $K_{MSL}$ key may be derived by both the WTRU and MME upon configuration or reconfiguration of multi-layer access, and the $K_{MSL}$ key may be transferred to the proxy MME. Update of the $K_{MSL}$ key may be performed by the MME upon request from the proxy-MME, and the new key may be transferred to the proxy MME. When the $K_{MSL}$ key is updated as a result of a procedure taking place between the WTRU and the proxy MME, the WTRU may use the NCC parameter signaled by the proxy MME in the key derivation. The WTRU may use a NCC parameter equal to the latest NCC parameter used in key derivation in either primary or secondary layer, plus one.

The $K_{MSL}$ key may be used as a basis for the derivation of additional keys used for specific purposes in the secondary layer, such as keys used for the encryption of user data ($K_{UPenc}$), encryption of signaling ($K_{CPenc}$), and/or integrity protection ($K_{IP}$). The derivation of these keys may use specific algorithm-type distinguishers as well as at least one additional parameter whose value may change, for example, for every new key derivation. For instance, in some solutions the parameter RAND used in an authentication procedure may be used to derive the additional keys.

When the termination point for the encryption of user data may be a gateway, the corresponding key ($K_{UPenc}$) may be calculated by the Proxy MME and signaled to the gateway.

When the termination point for a control protocol (secondary RRC) for the assignment of radio resources may be at the eNB, keys for encryption of the messages and for integrity protection may be calculated by the proxy MME and signaled to the eNB. Such keys may be different than the keys used for the transmission of control information between the WTRU and the proxy MME.

Authentication of the WTRU by the network and/or of some network elements by the WTRU, may take place at different occasions, such as during procedures allowing access of network resources by the WTRU. Once the secondary layer is configured and a proper security context (e.g., including key material) has been established at the WTRU and the Proxy MME, such authentication procedures may omit the MME.

For instance, to access resources of a cell of the secondary layer, the WTRU may send a presence indication message that may allow the network to properly route downlink traffic to the eNB that is controlling the cell. Before rerouting traffic towards this WTRU, the network may authenticate the WTRU, and the WTRU may authenticate the network. The procedure may also allow refresh of key material.

An authentication procedure may be initiated by the network. The authentication procedure may be initiated by a network node such as the Proxy MME or the gateway. This may happen, for instance, as a result of the WTRU initiating a procedure to access a new cell in the secondary layer. The WTRU may provide at least one of an identity parameter such as GUTI, TMSI or a tunnel identity, an encrypted tunnel identity, or a temporary secondary layer identity (TSLI), in a first message of the access procedure. The eNB controlling the cell may forward this information to a Gateway or a Proxy MME. The gateway may first receive the message from the eNB and may request the Proxy MME to initiate the authentication procedure.

The Proxy MME may identify the WTRU based on the provided identity parameter and may initiate an authentication procedure by determining a parameter RAND and an authentication token AUTN. The parameter RAND may be randomly selected and the AUTN may be calculated based on the $K_{MSL}$ key and the RAND parameter. The Proxy MME may assign a new secondary layer temporary identity (TSLI) to the WTRU. These parameters may be sent to the eNB and forwarded to the WTRU having requested access.

Upon reception of the response, the WTRU may verify that the AUTN matches the expected result based on its locally stored $K_{MSL}$ key and the provided RAND parameter. If AUTN was received but does not match the expected result, the WTRU may release the secondary layer configuration and/or may notify the MME through NAS signaling over the primary layer. Otherwise, the WTRU may calculate a response RES and may derive (or refresh) keys. The WTRU may send the response RES in a second message of the access procedure (or presence indication procedure) to the eNB.

The Proxy MME may consider the authentication successful, for example, if the parameter RES matches an expected response (XRES) calculated based on the RAND parameter and $K_{MSL}$ key.

An authentication procedure may be initiated by the WTRU. For instance, authentication may be part of a procedure to access a new cell in the secondary layer. The WTRU may determine a parameter RAND and an authentication token AUTN. The parameter RAND may be selected randomly from the WTRU from a predefined range, or may be provided by the cell it is attempting to access from system information. The WTRU may select the RAND parameter among the set of possible values that have not been used in any previous authentication procedure since the $K_{MSL}$ key was last changed. The AUTN parameter may be derived from the $K_{MSL}$ key and the RAND parameter as in the network-initiated procedure. The WTRU may send these parameters (RAND and AUTN) as well as an identity parameter to the cell as part of a message, which may be the same message as the one carrying the presence indication. The WTRU may also provide an address of the Proxy MME.

The eNB controlling the cell may forward the information (e.g., directly) to the Proxy MME, or may forward the information to the gateway, which may relay it to the Proxy MME. The Proxy MME may verify if the received authentication token AUTN matches the expected result based on its locally stored $K_{MSL}$ key and may determine that the authentication is successful if the verification is successful. The Proxy MME may also calculate a response RES and signal it to the WTRU through the eNB for the purpose of subsequent authentication by the WTRU. Upon reception of this message, the WTRU may compare the response RES with an expected response XRES calculated based on RAND and the locally stored $K_{MSL}$ key. If RES was received but does not match the expected result XRES, the WTRU may release the secondary layer configuration and/or may notify the MME through NAS signaling over the primary layer.

As part of an authentication procedure, the Proxy MME and WTRU may derive new keys such as, e.g., for the encryption of user data ($K_{UPenc}$), encryption of signaling ($K_{CPenc}$), and/or integrity protection ($K_{IP}$). The derivation may be based on at least one of the $K_{MSL}$ key, the RAND parameter, and respective algorithm type distinguishers. The derivation may also use an identity parameter, such as a tunnel identity, an encrypted tunnel identity, or a secondary layer temporary identity (TSLI).

The WTRU may start using the new keys for transmission and/or reception after completing transmission of the message containing the authentication parameters (RAND and/or AUTN) in case of a WTRU-initiated authentication procedure. The WTRU may start using the new keys for transmission and/or reception after receiving the message from the Proxy MME containing the authentication parameters (RAND and/or AUTN) in case of a network-initiated authentication procedure, if verification of AUTN is successful.

The Proxy MME may start using the new keys for transmission and reception and may signal at least one of the newly derived keys to the gateway after receiving the message from the WTRU containing the authentication parameters (RAND and/or AUTN) in case of a WTRU-initiated authentication procedure, if verification of AUTN is successful. The Proxy MME may start using the new keys for transmission and reception and may signal at least one of the newly derived keys to the gateway after completing transmission of the message containing the authentication parameters (RAND and/or AUTN) in case of a network-initiated authentication procedure. Key refresh may occur if indicated (e.g., explicitly indicated) in the message using a flag.

The WTRU may be assigned a secondary layer temporary identity (TSLI) as part of an authentication procedure or associated presence indication procedure. The identity may be known by the WTRU, the Proxy MME, and/or the gateway and may be changed after the WTRU sends the presence indication, or after the WTRU accesses a new cell or a cell of a new eNB, or when an authentication procedure is executed.

The TSLI may include a TEID, a combination of a gateway identity and a TEID, a combination of an eNB identity and a TEID, and/or an arbitrary identity selected by the Proxy MME. Any of these values may be encrypted, for example, using a key such as $K_{CPenc}$ or $K_{UPenc}$.

A WTRU may include TSLI along with parameters associated with authentication (e.g., RAND), for example, in a presence indication message. This may enable identification of the WTRU by the Proxy MME for authentication.

A new TSLI value may be provided to the WTRU by the Proxy MME or the gateway, for instance, after successful authentication, in a message possibly encrypted with a key, such as $K_{CPenc}$ or $K_{UPenc}$. Providing a new TSLI value may provide protection against WTRU tracking, since an attacker monitoring transmissions of presence indications to different eNBs may be unable to determine whether they originate from the same WTRU or not.

Encryption on control or user data may follow a ciphering algorithm that may be based on $K_{CPenc}$ or $K_{UPenc}$ as a cipher key and a COUNT parameter provided from a sequence number that may be included in every PDU at the protocol layer where encryption is performed. The ciphering algorithm may use the TSLI or a TEID, or a function thereof, as additional parameter to reduce the probability of key reuse.

When a WTRU sends the presence indication message, encryption may apply to at least a portion of the message. Some portions of the message may not be subject to encryption, such as the gateway identity, which may be used by an eNB to forward the message to the proper gateway, and the TSLI, which may be needed by the gateway to identify the WTRU sending the presence indication.

Figure 6:
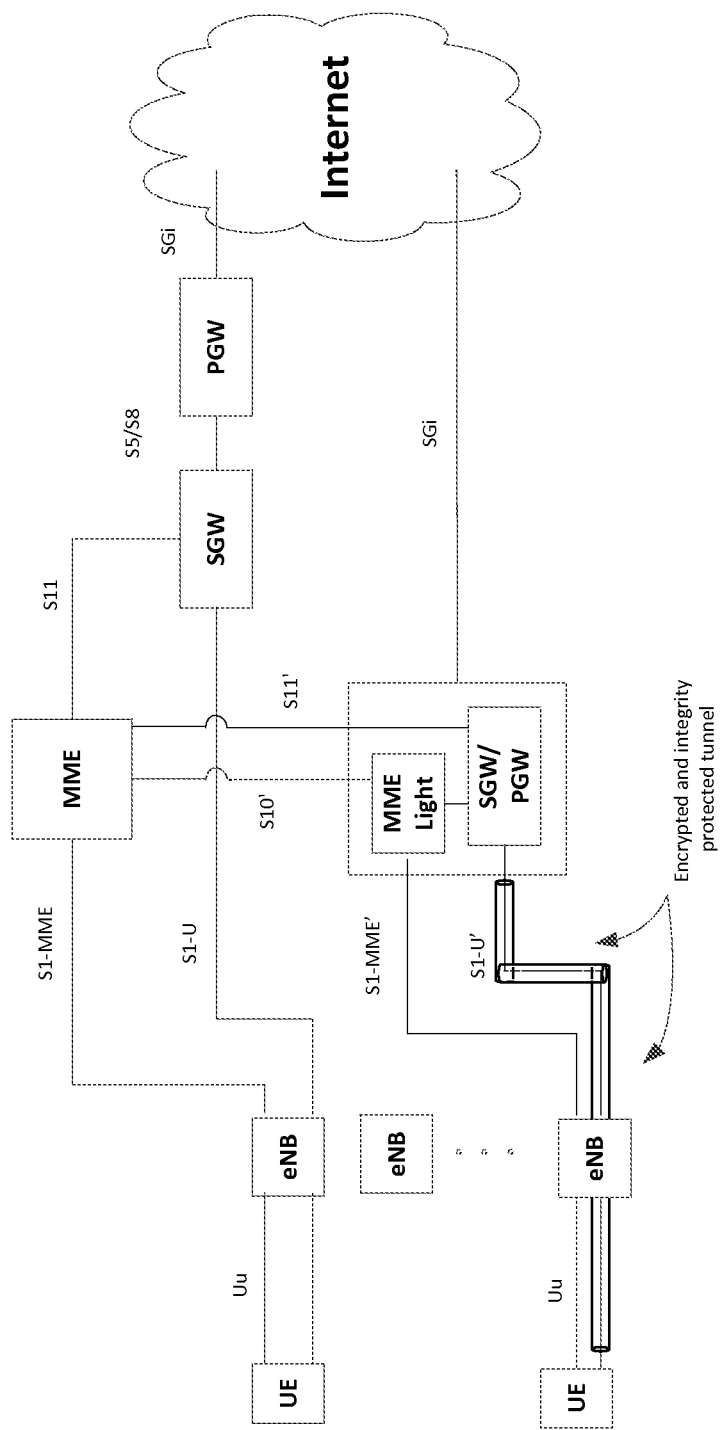
FIG. 6 depicts an example two-tier security model, consistent with embodiments.

FIG. 6 depicts an example two-tier security model. The security model of FIG. 6 may allow ciphering (e.g., encryption) and may provide integrity protection of control plane messages at both the Core Network (e.g., WTRU-MME) and RAN (e.g., WTRU-eNB) levels. The security model may allow ciphering (e.g., encryption) of user plane messages at the RAN (e.g., WTRU-eNB) level.

When operating under a multilayer mode, the WTRU may omit executing security procedures, for example, when moving from eNB to eNB within the multilayer area.

The network may enable end-to-end encryption and integrity protection of user plane packets between the WTRU and the Serving Gateway. This may avoid the need to execute a mobility mechanism when moving from one eNB to an eNB within a multilayer area.

Figure 7:
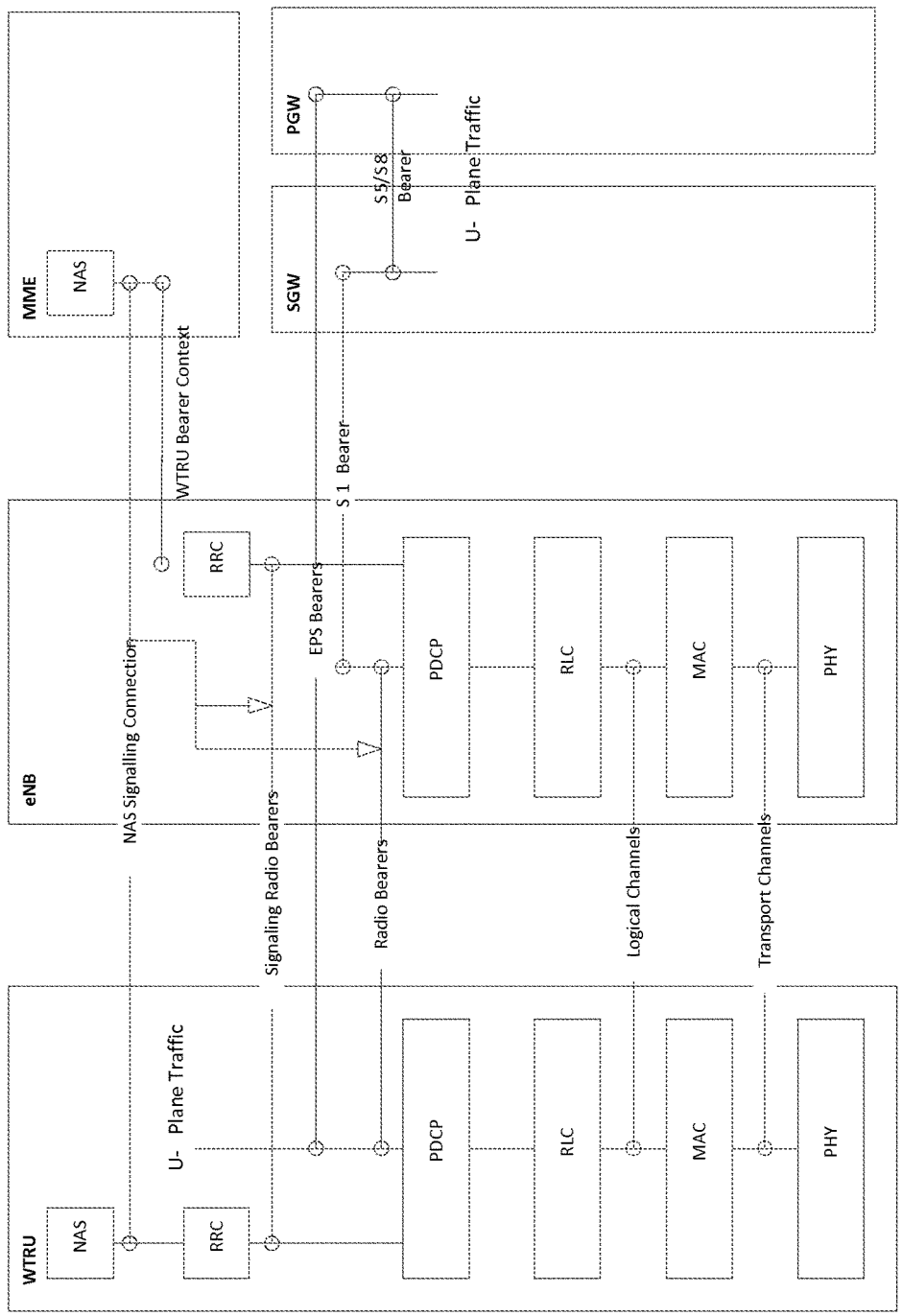
FIG. 7 and FIG. 8 depict example network configurations that may be used to provide end-to-end WTRU-SGW security, consistent with embodiments.
Figure 8:
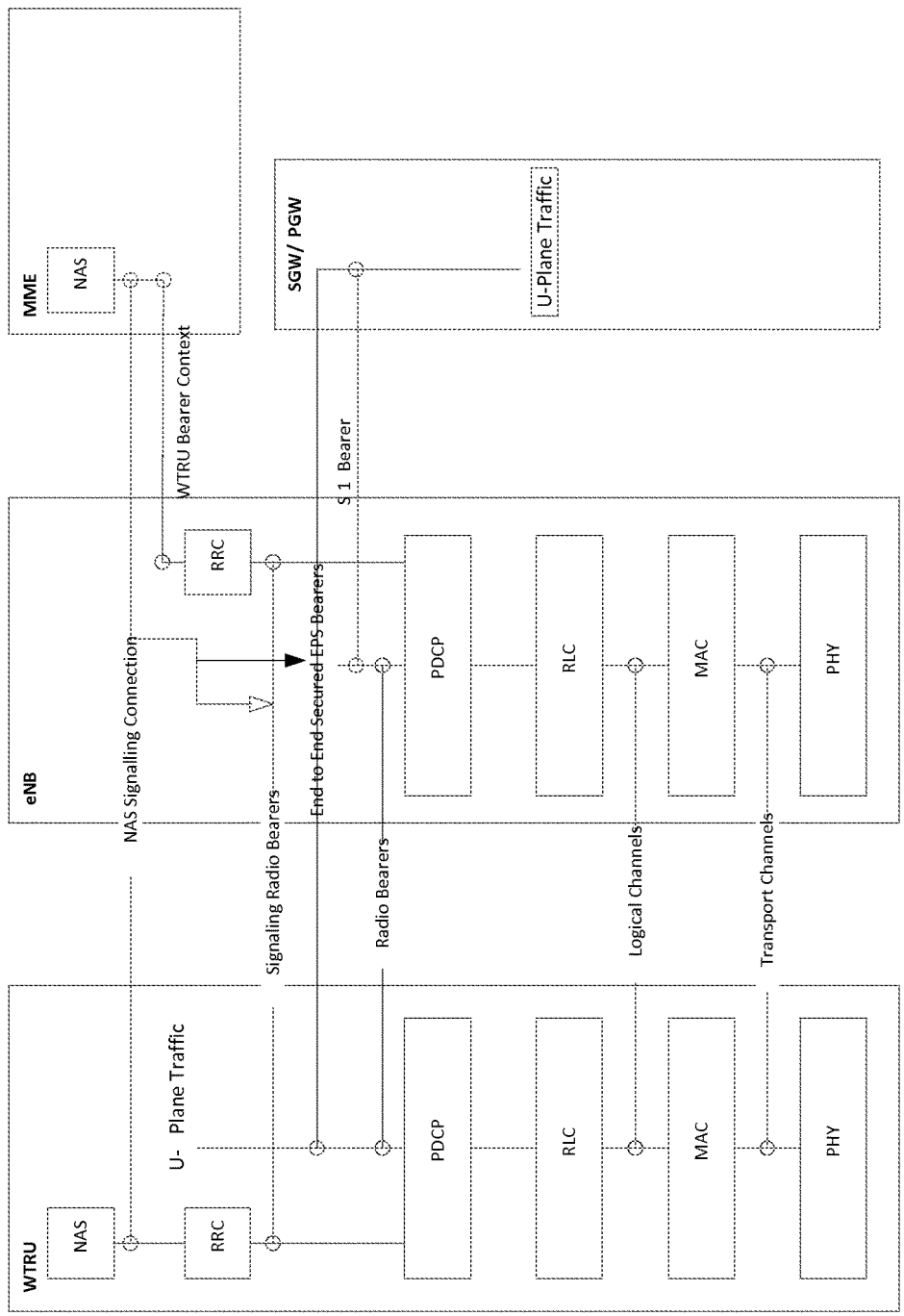

FIG. 6 depicts a network that may realize end-to-end WTRU-SGW security. Interfaces may be used to set up security associations between the WTRU and the SGW and to provide a scaled down version of the User Plane security association between the eNB and the WTRU. FIGS. 7 and 8 depict example network configurations that may be used to provide end-to-end WTRU-SGW security. User Plane no-integrity protection may be provided. User Plane integrity protection may be added between the WTRU and the SGW.

Figure 9:
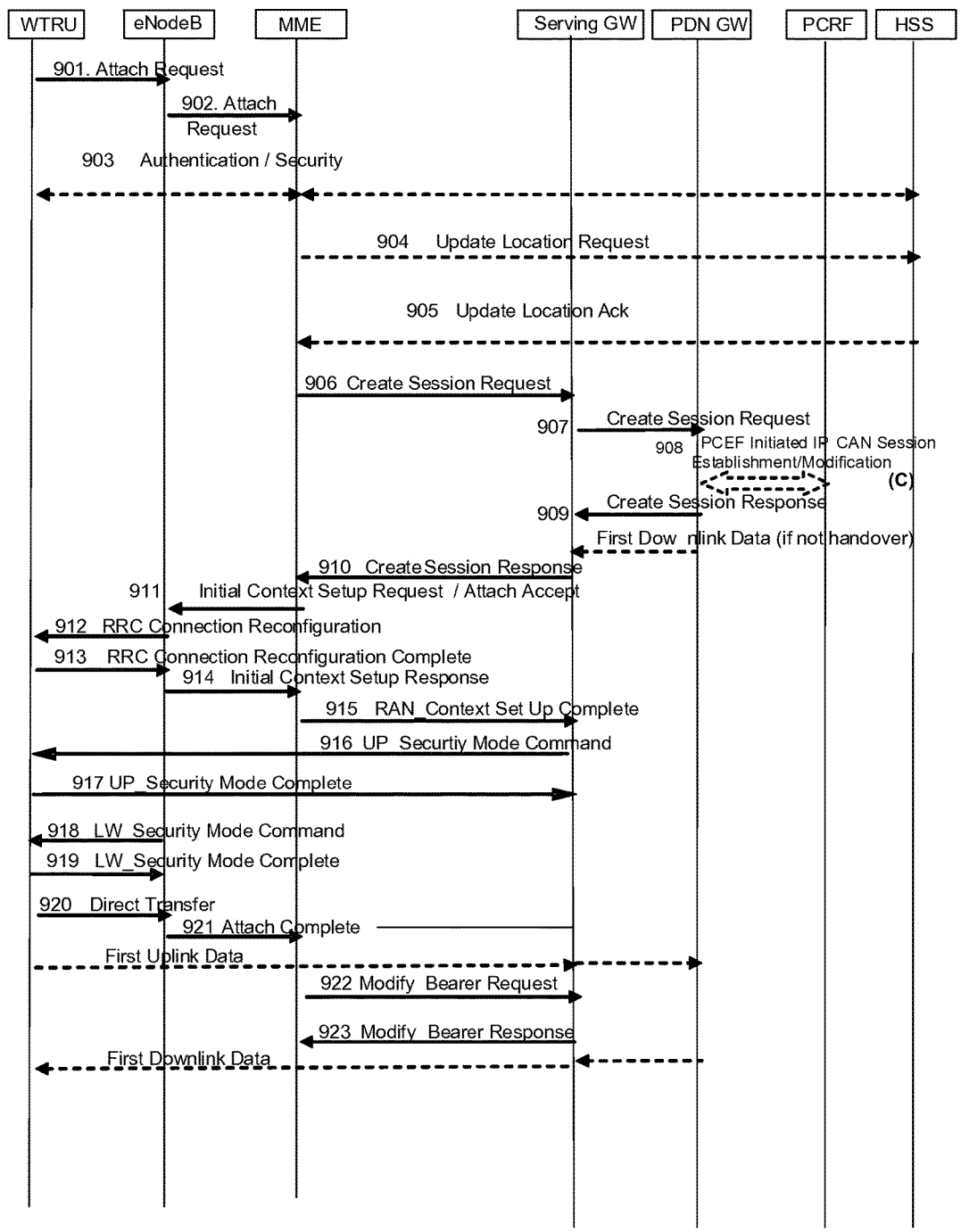
FIG. 9 illustrates an example message flow that may provide end-to-end WTRU-SGW security, consistent with embodiments.

FIG. 9 illustrates an example message flow that may provide end-to-end WTRU-SGW security. At 901, the WTRU may initiate an Attach procedure by transmitting an Attach Request to the eNodeB (eNB). At 902, the eNB may forward the Attach Request message to an MME included in an S1-MME control message (e.g., an initial WTRU message).

At 903, the WTRU, the MME, and/or the HSS may perform authentication and NAS security setup to activate integrity protection and NAS. At 904, the MME may send an Update Location Request (e.g., MME Identity, IMSI, ME Identity (IMEISV), MME Capabilities, ULR-Flags, Homogeneous Support of IMS Voice over PS Sessions, WTRU SRVCC capability, and/or an equivalent PLMN list) message to the HSS.

At 905, the HSS may acknowledge the Update Location message by sending an Update Location Acknowledgement (IMSI, Subscription data) message to the MME. The Subscription Data may include one or more PDN subscription contexts. Each PDN subscription context may comprise an EPS-subscribed QoS profile and the subscribed APN-AMBR. The subscription data may indicate whether the WTRU is capable of operating in multilayer Mode and/or may indicate the address of a preferred SGW that can provide multilayer services to this WTRU.

At 906, the MME may create a session request. If a subscribed PDN address is allocated for the WTRU for this APN, the PDN subscription context may include the WTRU's IPv4 address, the IPv6 prefix, and/or the PDN GW identity. If the PDN subscription context includes a subscribed IPv4 address and/or IPv6 prefix, the MME may indicate it in the PDN address. For Request Type indicating an initial request, if the WTRU does not provide an APN, the MME may use the PDN GW corresponding to the default APN for default bearer activation. If the WTRU provides an APN, this APN may be employed for default bearer activation.

The MME may select a Serving GW and may allocate an EPS Bearer Identity for the Default Bearer associated with the WTRU. If the WTRU is capable of operation in multilayer mode, the MME may select a suitable SGW, for example, using geographical or topological conditions or using the preferred SGW as per the WTRU subscription. The MME may send a Create Session Request (e.g., IMSI, MSISDN, MME TEID for control plane, PDN GW address, PDN Address, APN, RAT type, Default EPS Bearer QoS, PDN Type, APN-AMBR, EPS Bearer Identity, Protocol Configuration Options, Handover Indication, ME Identity (IMEISV), User Location Information (ECGI), WTRU Time Zone, User CSG Information, MS Info Change Reporting support indication, Selection Mode, Charging Characteristics, Trace Reference, Trace Type, Trigger Id, OMC Identity, Maximum APN Restriction, Dual Address Bearer Flag, the Protocol Type over S5/S8, Serving Network, and/or WTRU Multilayer Capability) message to the selected Serving GW.

At 907, the Serving GW may create a new entry in its EPS Bearer table and may send a Create Session Request message to the PDN GW indicated by the PDN GW address received at 906. The Serving GW may buffer any downlink packets it may receive from the PDN GW without sending a Downlink Data Notification message to the MME until it may receive the Modify Bearer Request message at 922.

If the WTRU is in multilayer mode, the SGW may not process any downlink or uplink packets to or from the WTRU until an UP_Security Mode Command/Complete operation is successfully executed.

If dynamic PCC is deployed and the Handover Indication is not present, the PDN GW may perform an IP-CAN Session Establishment procedure at 908.

At 909, the PGW may create an entry in its EPS bearer context table and may generate a Charging Id for the Default Bearer. The entry may allow the PGW to route user plane PDUs between the SGW and the packet data network, and to start charging.

The PDN GW may return a Create Session Response (e.g., PDN GW Address for the user plane, PDN GW TEID of the user plane, PDN GW TEID of the control plane, PDN Type, PDN Address, EPS Bearer Identity, EPS Bearer QoS, Protocol Configuration Options, Charging Id, Prohibit Payload Compression, APN Restriction, Cause, MS Info Change Reporting Action (Start) (if the PDN GW decides to receive the WTRU's location information during the session), CSG Information Reporting Action (Start) (if the PDN GW decides to receive the WTRU's User CSG information during the session), and/or APN-AMBR) message to the Serving GW.

At 910, the Serving GW may return a Create Session Response (e.g., PDN Type, PDN Address, Serving GW address for User Plane, Serving GW TEID for S1-U User Plane, Serving GW TEID for control plane, EPS Bearer Identity, EPS Bearer QoS, PDN GW addresses and TEIDs (GTP-based S5/S8) or GRE keys (PMIP-based S5/S8) at the PDN GW(s) for uplink traffic, Protocol Configuration Options, Prohibit Payload Compression, APN Restriction, Cause, MS Info Change Reporting Action (Start), CSG Information Reporting Action (Start), APN-AMBR, and/or Multilayer Mode Enabled) message to the MME.

At 911, the MME may send an Attach Accept (e.g., APN, GUTI, PDN Type, PDN Address, TAI List, EPS Bearer Identity, Session Management Request, Protocol Configuration Options, NAS sequence number, NAS-MAC, IMS Voice over PS session supported Indication, Emergency Service Support indicator, LCS Support Indication, and/or Multilayer Mode Enabled) message to the eNodeB. This S1 control message may include the AS security context information for the WTRU, the Handover Restriction List, the EPS Bearer QoS, the WTRU-AMBR, EPS Bearer Identity, as well as the TEID at the Serving GW used for user plane and the address of the Serving GW for user plane.

At 912, the eNodeB may send the RRC Connection Reconfiguration message including the EPS Radio Bearer Identity to the WTRU, and the Attach Accept message may be sent along to the WTRU. The WTRU may store the QoS Negotiated, Radio Priority, Packet Flow Id and/or TI, which it may have received in the Session Management Request, for use when accessing via GERAN or UTRAN. The APN is provided to the WTRU to notify it of the APN for which the activated default bearer is associated. The WTRU may provide EPS Bearer QoS parameters to the application handling the traffic flow or flows. The application usage of the EPS Bearer QoS may be implementation-dependent. The WTRU may not reject the RRC Connection Reconfiguration on the basis of the EPS Bearer QoS parameters contained in the Session Management Request. If the WTRU is operating on multilayer mode, the eNB may enable Control Plane Ciphering and Integrity Protection. User Plane security may be executed between the WTRU and SGW.

The WTRU may send the RRC Connection Reconfiguration Complete message to the eNodeB at 913. At 914, the eNodeB may send the Initial Context Response message to the MME. This Initial Context Response message may include the TEID of the eNodeB and the address of the eNodeB used for downlink traffic on the S1_U reference point.

At 915, if the WTRU is operating in Multilayered Mode, the MME may send a RAN Context Setup message to the SGW, providing the SGW security Context for the WTRU. At 916, the SGW may send a Security Mode Command (e.g., Selected SGW algorithm and/or eKSI). At 917, the WTRU may respond to the SGW with an SGW Security Mode Complete (SGW-MAC) message.

At 918, the eNB may send an LW Security Mode Command to enable RRC encryption and integrity protection. The WTRU may respond at 919 with an LW Security Mode Complete message.

The WTRU may send a Direct Transfer message to the eNodeB at 920. The Direct Transfer message may include the Attach Complete (EPS Bearer Identity, NAS sequence number, NAS-MAC) message. At 921, the eNodeB may forward the Attach Complete message to the MME in an Uplink NAS Transport message.

When the MME receives the Initial Context Response message at 914 and the Attach Complete Attach Complete message at 921, the MME may send a Modify Bearer Request (e.g., EPS Bearer Identity, eNodeB address, eNodeB TEID, and/or Handover Indication) message to the Serving GW at 922. The MME may pass the WTRU security Context using a Modify Bearer Request message.

At 923, the Serving GW may acknowledge by sending Modify Bearer Response (EPS Bearer Identity) message to the new MME. The Serving GW may send its buffered downlink packets. The SGW can execute the Security Mode Procedure, if the MME passes the WTRU security Context using the existing Modify Bearer Request message.

A WTRU may support layered connectivity. The WTRU may be in a RRC IDLE mode in a primary layer. The WTRU may determine that it may access the network (e.g., due to uplink data being available for transmission, and/or reception of paging). The WTRU may move to RRC CONNECTED mode, indicate its WTRU capabilities for layered connectivity, and receive a configuration from the network for operation using secondary connectivity.

The configuration may be received by RRC and may include a NAS message received from the MME. The configuration may include security parameters, IP tunneling parameters, and/or a default physical and/or L2 configuration. Such configuration may also include policies for uplink traffic, such as packet filters, as well as parameters related to inter-arrival time, bit rate and QoS level. The WTRU may use the policies and/or parameters to subsequently determine whether the WTRU may transmit applicable data by accessing and using the (legacy) primary layer or by accessing and using the secondary layer (if available). The configuration may also include one or more techniques to determine whether or not a cell is available for layered connectivity, which may include frequency information, cell identity, measurement configuration, or the like.

In parallel with its procedures (e.g., legacy procedures) and behavior for the primary layer (e.g., whether the WTRU is kept in CONNECTED mode or released to IDLE mode), the WTRU may initiate measurements (if configured) and/or system information acquisition (e.g., if the WTRU is not configured with a list of applicable cell identities) such that it can select a suitable cell as a candidate for secondary connectivity. The WTRU may initiate the procedure, for example, when it determines that a transmission for applicable data may be useful.

Figure 10:
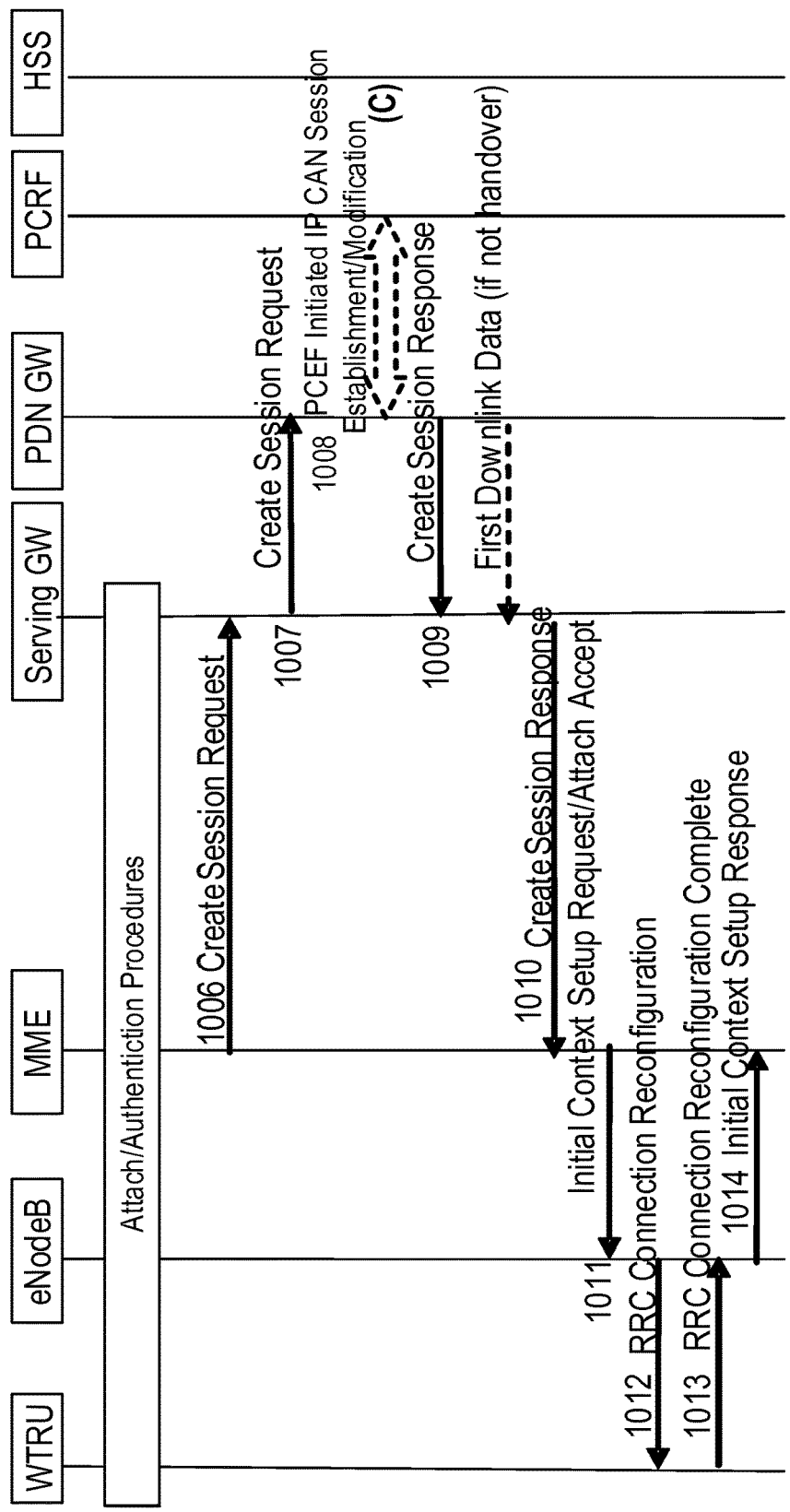
FIG. 10 illustrates an example message flow for bearer establishment in multilayer mode, consistent with embodiments.

FIG. 10 illustrates an example message flow for bearer establishment in multilayer mode. At 1006, when an Authentication procedure is complete, the MME may request the creation of bearers by sending a Create Session Request to the SGW identified during the SGW selection procedure. The MME may indicate to the SGW that the WTRU is operating in multilayer mode. At 1007, the Serving GW may send a create session request to the PDN GW. At 1008, a PCEF initiated IPCAN session may be established and/or modified. At 1009, the PDN GW may send a session creation response to the Serving GW.

At 1010, the SGW may execute a bearer setup procedure and may establish a multilayer context that may indicate to the SHW that it not process UL or DL packets, perhaps for example until the SGW security Procedure is completed towards the WTRU operating in multilayer mode. The SGW may inform the MME, e.g., in the Create Session Response message, that a multilayer context has been established and the MME may inform the SGW when radio resources are set up to trigger the execution of a SGW security mode procedure as disclosed herein.

At 1011, if the multilayer operation is setup, the MME may inform the eNB that security procedures may be executed in multilayer mode and that the tunnel endpoint information at the SGW may be communicated to the WTRU.

Figure 11:
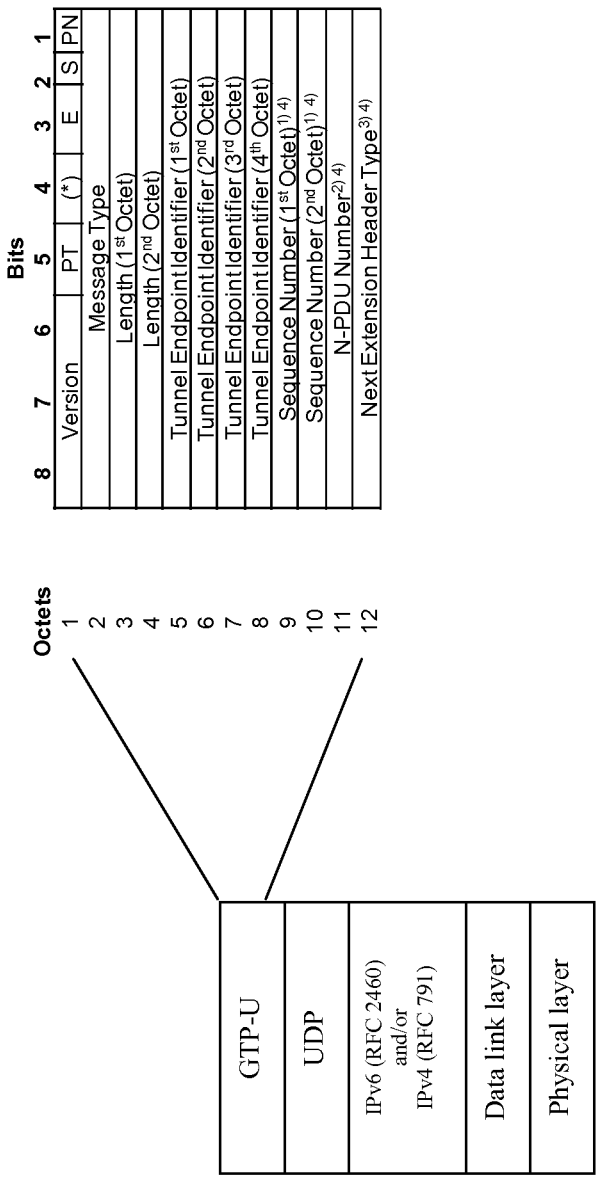
FIG. 11 illustrates an example tunnel endpoint definition, consistent with embodiments.

At 1012, the eNB may pass the Tunnel Endpoint information for the SGW operating in multilayer mode, including the TEID and Transport Layer address of the Multilayer SGW, as shown in FIG. 11. The WTRU may use this information when accessing eNB across a multilayer area upon establishment of Data Radio Bearers in the new target eNB. At 1013, the WTRU may send a configuration complete message to the eNB. At 1014, the eNB may send a context set-up response to the MME.

The processes and instrumentalities described herein may apply in any combination, may apply to other wireless technologies, and for other services.

A WTRU may refer to an identity of the physical device, or to the user's identity such as subscription related identities, e.g., MSISDN, SIP URI, etc. WTRU may refer to application-based identities, e.g., user names that may be used per application.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A wireless transmit/receive unit (WTRU) in communication with a wireless communication network, comprising:
a receiver, the receiver configured to:
receive a configuration for a connectivity context corresponding to an Radio Resource Control (RRC) RRC_INACTIVE state, the configuration including a WTRU identity associated with the connectivity context corresponding to the RRC_INACTIVE state; and
receive a listing of cells for a coverage area corresponding to the connectivity context corresponding to the RRC_INACTIVE state; and
a processor, the processor configured to:
enter the RRC_INACTIVE state;
perform, in the RRC_INACTIVE state, one or more measurements on one or more cells;
perform, in the RRC_INACTIVE state, a cell reselection based on the one or more measurements; and
send a message to initiate a transition from the RRC_INACTIVE STATE to an RRC_CONNECTED state, the message comprising the WTRU identity associated with the connectivity context corresponding to the RRC_INACTIVE state.

2. The WTRU of claim 1, wherein the processor is further configured such that the message to initiate the transition from the RRC_INACTIVE STATE to the RRC_CONNECTED STATE is sent based on at least one of: a determination to send a presence notification, or a determination to conduct a routing update procedure.

3. The WTRU of claim 2, wherein the determination to at least one of: send the presence notification, or conduct the routing update, includes a determination that the WTRU has left the coverage area corresponding to the connectivity context corresponding to the RRC_INACTIVE state.

4. The WTRU of claim 1, wherein the processor is further configured such that the RRC_INACTIVE state is entered upon a receipt of an indication from a node of the wireless communication network to enter the RRC_INACTIVE state.

5. The WTRU of claim 1, wherein the processor is further configured such that the performance of the cell reselection is part of a WTRU controlled mobility procedure in the RRC_INACTIVE state.

6. The WTRU of claim 1, wherein the processor is further configured such that the message to initiate the transition from the RRC_INACTIVE STATE to the RRC_CONNECTED STATE is sent based on at least one of: a determination to send uplink (UL) data to a node of the wireless communication network, or a determination that a page is being directed to the WTRU.

7. The WTRU of claim 1, wherein the processor is further configured such that the performance of the one or more measurements on the one or more cells is conducted on one or more cells included in the listing of cells.

8. The WTRU of claim 1, wherein the processor is further configured to send a message to initiate a transition from the RRC_CONNECTED state to an RRC_IDLE state.

9. The WTRU, of claim 1, wherein the processor is further configured such that the WTRU operates in the RRC_INACTIVE state without an RRC connection.

10. The WTRU of claim 1, wherein the processor is further configured such that the message to initiate the transition is sent to one or more cells included in the listing of cells.

11. The WTRU of claim 1, wherein the processor is further configured such that the message to initiate the transition is sent to one or more cells not included in the listing of cells.

12. A method performed by a wireless transmit/receive unit (WTRU) in communication with a wireless communication network, the method comprising:
    receiving, via a receiver, a configuration for a connectivity context corresponding to an Radio Resource Control (RRC) RRC_INACTIVE state, the configuration including a WTRU identity associated with the connectivity context corresponding to the RRC_INACTIVE state;
    receiving, via the receiver, a listing of cells for a coverage area corresponding to the connectivity context corresponding to the RRC_INACTIVE state;
    entering the RRC_INACTIVE state;
    performing, in the RRC_INACTIVE state, one or more measurements on one or more cells;
    performing, in the RRC_INACTIVE state, a cell reselection based on the one or more measurements; and
    sending a message to initiate a transition from the RRC_INACTIVE STATE to an RRC_CONNECTED state, the message comprising the WTRU identity associated with the connectivity context corresponding to the RRC_INACTIVE state.

13. The method of claim 12, wherein the sending the message to initiate the transition from the RRC_INACTIVE STATE to the RRC_CONNECTED STATE is based on at least one of: a determination to send a presence notification, or a determination to conduct a routing update procedure.

14. The method of claim 13, wherein the determination to at least one of: send the presence notification, or conduct the routing update, includes determining that the WTRU has left the coverage area corresponding to the connectivity context corresponding to the RRC_INACTIVE state.

15. The method of claim 12, wherein the entering the RRC_INACTIVE state is executed upon a receipt of an indication from a node of the wireless communication network to enter the RRC_INACTIVE state.

16. The method of claim 12, wherein the performing the cell reselection is part of a WTRU controlled mobility procedure in the RRC_INACTIVE state.

17. The method of claim 12, wherein the sending the message to initiate the transition from the RRC_INACTIVE STATE to the RRC_CONNECTED STATE is based on at least one of: a determination to send uplink (UL) data to a node of the wireless communication network, or a determination that a page is being directed to the WTRU.

18. The method of claim 12, wherein the performing the one or more measurements on the one or more cells is conducted on one or more cells included in the listing of cells.

19. The method of claim 12, further comprising sending a message to initiate a transition from the RRC_CONNECTED state to an RRC_IDLE state.

20. The method of claim 12, wherein the entering the RRC_INACTIVE state includes the WTRU operating in the RRC_INACTIVE state without an RRC connection.

21. The method of claim 12, wherein the message to initiate the transition is sent to one or more cells included in the listing of cells.

22. The method of claim 12, wherein the message to initiate the transition is sent to one or more cells not included in the listing of cells.

* * * * *